(12) United States Patent
Li et al.

(10) Patent No.: US 11,356,987 B2
(45) Date of Patent: Jun. 7, 2022

(54) METHOD AND EQUIPMENT FOR TRANSMITTING UPLINK CONTROL INFORMATION AND SETTING UPLINK TIME ADVANCE

(71) Applicant: Samsung Electronics Co., Ltd., Suwon-si (KR)

(72) Inventors: Yingyang Li, Beijing (CN); Yi Wang, Beijing (CN); Shichang Zhang, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 89 days.

(21) Appl. No.: 16/146,284

(22) Filed: Sep. 28, 2018

(65) Prior Publication Data

US 2019/0104515 A1  Apr. 4, 2019

(30) Foreign Application Priority Data

Sep. 30, 2017 (CN) .......................... 201710915648.5
Nov. 6, 2017 (CN) .......................... 201711078498.3
(Continued)

(51) Int. Cl.
  *H04W 72/04* (2009.01)
  *H04L 1/18* (2006.01)
  (Continued)

(52) U.S. Cl.
  CPC ....... *H04W 72/0413* (2013.01); *H04L 1/1671* (2013.01); *H04L 1/1861* (2013.01);
  (Continued)

(58) Field of Classification Search
  CPC ......... H04W 72/1284; H04W 72/0413; H04W 72/04; H04W 72/0446; H04W 72/12;
  (Continued)

(56) References Cited

U.S. PATENT DOCUMENTS

2010/0195629 A1  8/2010  Chen et al.
2015/0230238 A1*  8/2015  Kim ...................... H04L 1/0073
  370/329

(Continued)

FOREIGN PATENT DOCUMENTS

EP  3684125 A1  7/2020

OTHER PUBLICATIONS

Intel Corporation, Short PUCCH format for UCI up to 2 bits, 3GPP TSG RAN WG1 Meeting #90, R1-1712576, Prague, Czech Republic, Aug. 12, 2017 See sections 1-2.

(Continued)

*Primary Examiner* — Asad M Nawaz
*Assistant Examiner* — Najeeb Ansari
(74) *Attorney, Agent, or Firm* — Jefferson IP Law, LLP

(57) ABSTRACT

A method for transmitting uplink control information (UCI) is provided. The method includes determining, by a user equipment (UES), the physical uplink control channel (PUSCH) resource for transmitting hybrid automatic repeat request acknowledgement (HARQ-ACK) information and scheduling request (SR) information, and determining, by the UE, an occupied PUCCH resource and transmitting the HARQ-ACK and SR according to the SR resource and whether it is necessary to transmit the SR currently.

18 Claims, 9 Drawing Sheets

(30) Foreign Application Priority Data

| | | | |
|---|---|---|---|
| Nov. 16, 2017 | (CN) | .......................... | 201711140804.1 |
| Jan. 11, 2018 | (CN) | .......................... | 201810028301.3 |
| Jan. 23, 2018 | (CN) | .......................... | 201810065212.6 |

(51) Int. Cl.
  *H04L 1/16* (2006.01)
  *H04W 72/12* (2009.01)

(52) U.S. Cl.
  CPC .......... *H04L 1/1864* (2013.01); *H04L 1/1887* (2013.01); *H04W 72/1284* (2013.01); *H04W 72/1263* (2013.01)

(58) Field of Classification Search
  CPC .. H04W 52/146; H04W 52/325; H04L 5/0055
  See application file for complete search history.

(56) References Cited

U.S. PATENT DOCUMENTS

| | | | | |
|---|---|---|---|---|
| 2015/0289259 | A1* | 10/2015 | Yang | .......................... H04L 5/00 370/329 |
| 2017/0041923 | A1* | 2/2017 | Park | .................... H04L 5/0053 |
| 2017/0111897 | A1 | 4/2017 | Kim et al. | |
| 2017/0245263 | A1 | 8/2017 | Li et al. | |
| 2018/0176806 | A1* | 6/2018 | Suzuki | ..................... H04J 11/00 |
| 2019/0013980 | A1* | 1/2019 | Gao | ..................... H04L 1/1607 |
| 2020/0008227 | A1* | 1/2020 | Lee | .................. H04W 28/0278 |
| 2020/0037298 | A1* | 1/2020 | Shi | .................... H04W 72/0406 |
| 2020/0127795 | A1* | 4/2020 | Matsumura | ........... H04L 1/1812 |
| 2020/0178274 | A1* | 6/2020 | Shi | .................... H04W 72/1268 |
| 2020/0280427 | A1* | 9/2020 | Liu | ........................ H04L 5/0055 |
| 2020/0396758 | A1* | 12/2020 | Falahati | ............ H04W 72/1284 |
| 2020/0413428 | A1* | 12/2020 | Liu | .................... H04W 72/0446 |

OTHER PUBLICATIONS

Huawei et al., Short PUCCH for UCI of up to 2 bits, 3GPP TSG RAN WG1 Meeting #90, R1-1712190, Prague, Czech Republic, Aug. 12, 2017 See section 2.3.

International Search Report dated Feb. 13, 2019, issued in the International Patent Application No. PCT/KR2018/011666.

Extended European Search Report dated Sep. 2, 2020, issued in a counterpart European Application No. 18861112.3-1205 / 3676983.

Nokia, Nokia Shanghai Bell; Remaining details of short PUCCH for UCI up to 2 bits; 3GPP TSG RAN WG1 NR Ad-Hoc #3; R1-1716139; Sep. 17, 2017, Nagoya, Japan.

Ericsson; On UL Data Transmission Procedure; 3GPP TSG RANI WGI Meeting NR#3; RI-1716597; Sep. 17, 2017, Nagoya, Japan.

Nokia, Alcatel-Lucent Shanghai Bell; Multiplexing between SR and other UCI on short PUCCH; 3GPP TSG RAN WG1#89; R1-1708511; May 6, 2017, Hangzhou, P.R. China.

Intel Corporation; UL data transmission procedures in NR; 3GPP TSG RAN WG1 Meeting NR#3; R1-1716323; Sep. 12, 2017, Nagoya, Japan.

Extended European Search Report dated Mar. 31, 2022, issued in a counterpart European Application No. 18861112.3-1205.

Indian Office Action dated Mar. 3, 2022, issued in a counterpart Indian Application No. 202037017212.

* cited by examiner

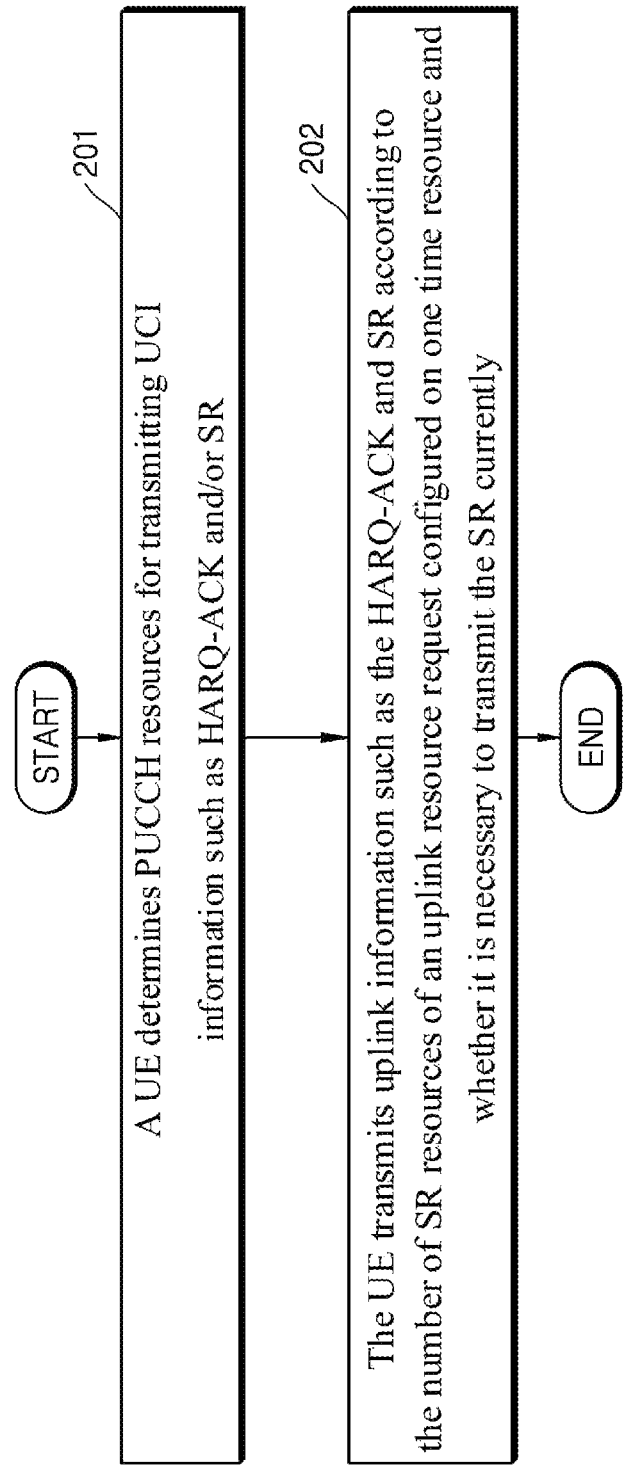

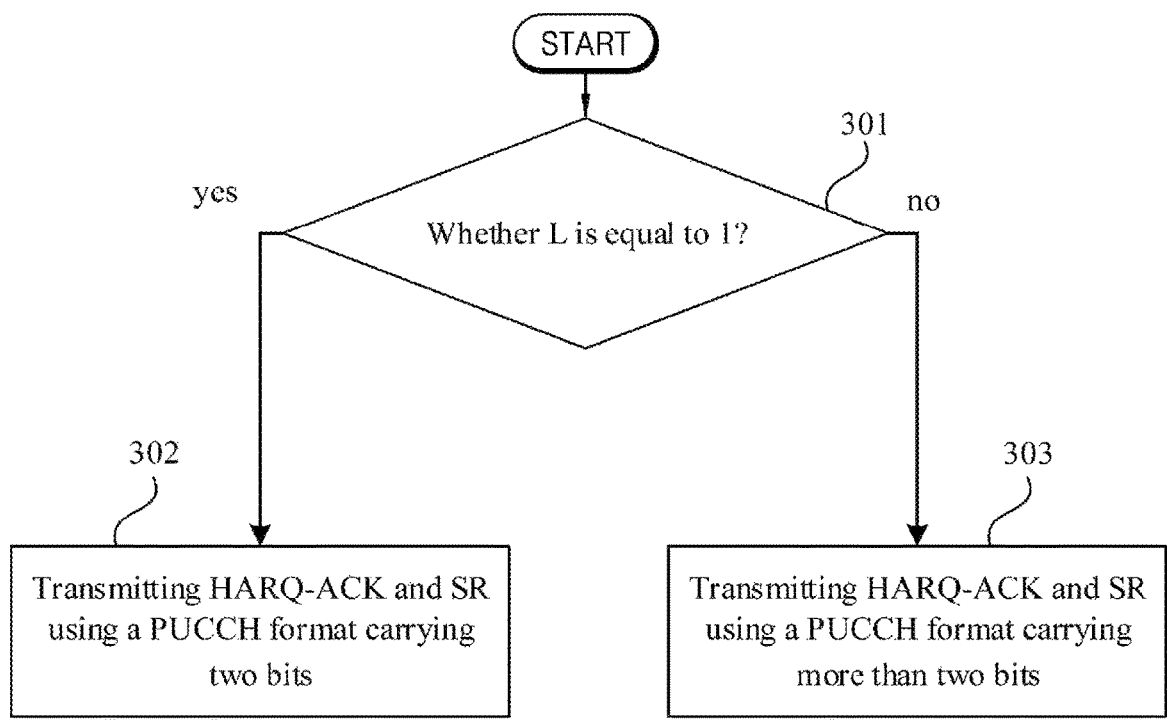
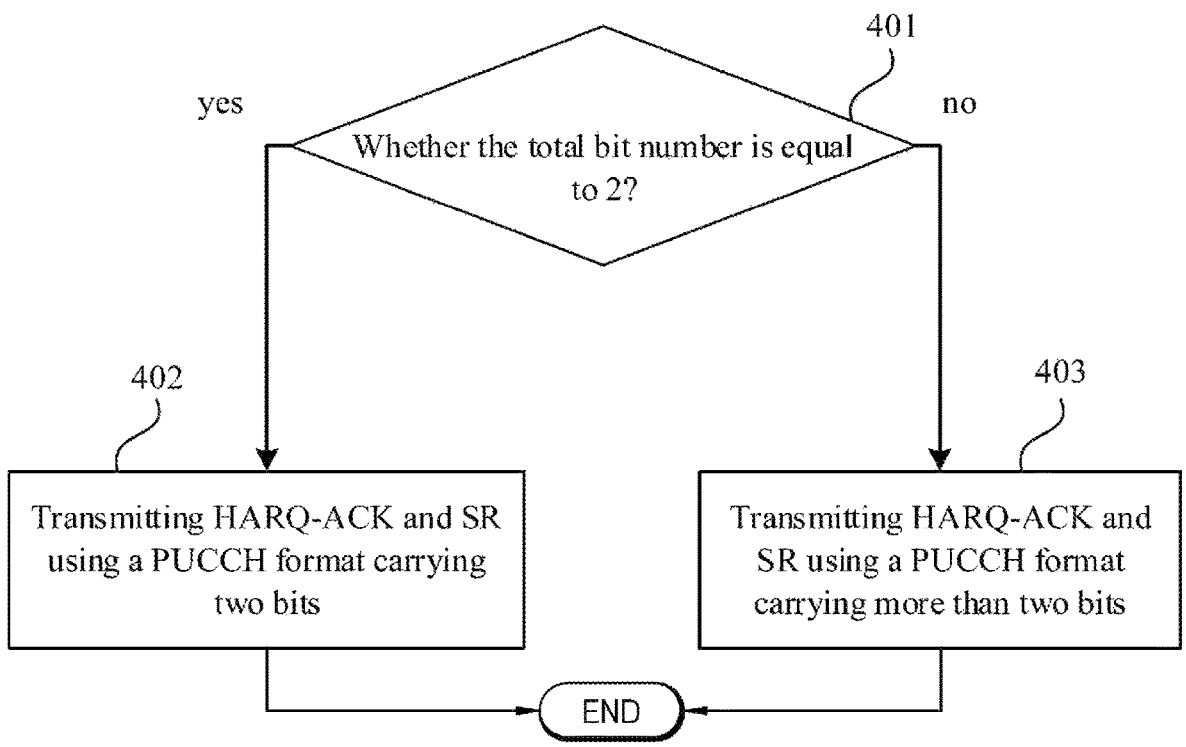

METHOD AND EQUIPMENT FOR TRANSMITTING UPLINK CONTROL INFORMATION AND SETTING UPLINK TIME ADVANCE

CROSS-REFERENCE TO RELATED APPLICATION(S)

This Applications is based on and claims priority under 35 U.S.C. § 119(a) of a Chinese patent application number 201710915648.5, filed on Sep. 30, 2017, in the Chinese Intellectual Property Office, of a Chinese patent application number 201711078498.3, filed on Nov. 6, 2017, in the Chinese Intellectual Property Office, of a Chinese patent application number 201711140804.1, filed on Nov. 16, 2017, in the Chinese Intellectual Property Office, of a Chinese patent application number 201810028301.3, filed on Jan. 11, 2018, in the Chinese Intellectual Property Office, and of a Chinese patent application number 201810065212.6, filed on Jan. 23, 2018, in the Chinese Intellectual Property Office, the disclosure of each of which is incorporated by reference herein in its entirety.

BACKGROUND

1. Field

The disclosure relates to a wireless communication system technology. More particularly, the disclosure relates to a method and an equipment for transmitting uplink control information (UCI) and setting an uplink time advance (TA).

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and equipment for transmitting uplink control information (UCI).

Another aspect of the disclosure is to provide a mechanism for improving transmission performance of a short physical uplink control channel (PUCCH) and multiplexing other uplink signals, such as scheduling request (SR) and hybrid automatic repeat request acknowledgement (HARQ-ACK).

Additional aspects will be set forth in part in the description which follows and, in part, will be apparent from the description, or may be learned by practice of the presented embodiments.

To achieve the above objective, the present application adopts the following technical schemes.

In accordance with an aspect of the disclosure, a method for transmitting UCI is provided. The method includes determining, by a user equipment (UE), PUCCH resource for transmitting HARQ-ACK information and/or SR information, and determining, by the UE, an occupied PUCCH resource and transmitting the HARQ-ACK and SR according to the SR resource configured on one time resource and whether it is necessary to transmit the SR currently.

Preferably, the operation of determining, by a UE, the PUCCH resources for transmitting HARQ-ACK and/or SR comprising for short PUCCH (SPUCCH), determining, by the UE, a PUCCH resource for transmitting HARQ-ACK and/or SR as the SPUCCH when it is necessary to carry UCI information of less than or equal to two bits, wherein, the SPUCCH resource consists of four SPUCCH sequences, the four SPUCCH sequences are divided into two groups, and each of the two SPUCCH sequences in each group constitute an SPUCCH resource carrying one bit of UCI information.

Preferably, only two of the four SPUCCH sequences of the one SPUCCH resource are occupied when it is actually necessary to transmit one bit of HARQ-ACK, and the two SPUCCH sequences constitute one SPUCCH resource carrying one bit of UCI information.

Preferably, the operation of determining, by a UE, the PUCCH resources for transmitting HARQ-ACK and/or SR comprising determining, by the UE, a PUCCH resource for transmitting HARQ-ACK and/or SR as the SPUCCH resource, wherein, for different SPUCCH resources, the HARQ-ACK information mapped by the PUCCH sequence with a same index changes alternately.

Preferably, the operation of determining, by a UE, a PUCCH resource for transmitting HARQ-ACK and/or SR comprising determining, by the UE, the PUCCH resource for transmitting HARQ-ACK and/or SR includes eight SPUCCH sequences, when it is actually necessary to transmit two bits of HARQ-ACK, of which four are for the case that it is unnecessary to request an uplink resource and the other four are for the case that it is necessary to request the uplink resource, and the operation of determining, by the UE, an occupied PUCCH resource according to the SR resource configured on one time resource and whether it is necessary to transmit the SR currently comprising determining two of the four SPUCCH sequences for the case where it is unnecessary to request the uplink resource and the other two of the four SPUCCH sequences for the case where it is necessary to request the uplink resource, to carry one bit of HARQ-ACK and one SR, when it is actually necessary to transmit one bit of HARQ-ACK, or, determining the four SPUCCH sequences for the case where it is unnecessary to request the uplink resource to carry one bit of HARQ-ACK and one SR, or, determining the four SPUCCH sequences for the case where it is necessary to request the uplink resource to carry one bit of HARQ-ACK and one SR, when it is actually necessary to transmit one bit of HARQ-ACK.

Preferably, for an SR bit, "request" is mapped to non-ACK (NACK) and "no request" is mapped to ACK.

Preferably, the operation of determining, by the UE, a PUCCH resource actually occupied, according to the SR resource configured on one time resource and whether it is necessary to transmit the SR currently, includes determining the number of bits of the HARQ-ACK which is necessary to be fed back currently is L and assuming that only one SR resource is configured on one time resource, only if L is equal to 1, transmitting, by the UE, L bit of HARQ-ACK and SR using the PUCCH format carrying two bits, if L is greater than 1, transmitting, by the UE, L bit of HARQ-ACK and SR information using the PUCCH format carrying more than two bits.

Preferably, the operation of determining, by the UE, an occupied PUCCH resource according to the SR resource configured on one time resource and whether it is necessary to transmit the SR currently comprising the number of bits of HARQ-ACK which is necessary to be fed back is L and assuming that the number K of SR resources of the UE actually configured on one time resource is greater than 1, transmitting, by the UE, L bit of HARQ-ACK and SR information using the PUCCH format carrying more than two bits, or, when K is equal to 2 or 3 and L is equal to 1, transmitting, by the UE, the HARQ-ACK and SR using the PUCCH format carrying two bits, or when K is not equal to 2 or 3, or when L is not equal to 1, transmitting, by the UE, the HARQ-ACK and SR using the PUCCH format carrying more than two bits.

Preferably, the operation of determining, by the UE, an occupied PUCCH resource according to the SR resource configured on one time resource and whether it is necessary to transmit the SR currently comprising the total number of bits of the HARQ-ACK and SR which is necessary to be fed back currently is S, and when S is less than or equal to 2, transmitting, by the UE, the HARQ-ACK and SR using the PUCCH format carrying two bits, when S is greater than 2, transmitting, by the UE, HARQ-ACK and SR information using the PUCCH format carrying more than two bits, or, when S is less than or equal to 3, transmitting, by the UE, HARQ-ACK and SR using the PUCCH format carrying two bits, when S is greater than 3, transmitting, by the UE, the HARQ-ACK and SR information using the PUCCH format carrying more than two bits.

Preferably, the operation of determining, by the UE, an occupied PUCCH resource according to the SR resource configured on one time resource and whether it is necessary to transmit the SR currently comprising assuming that the number K of the SR resources of the UE actually configured on one time resource is greater than 1 and only when the UE indicates the uplink resource request of a specified SR in the K SR resources, transmitting, by the UE, HARQ-ACK and specified SR information supporting using the PUCCH format carrying less than or equal to two bits, otherwise transmitting, by the UE, HARQ-ACK and other K−1 pieces of SR information using the PUCCH format carrying more than two bits.

Preferably, the operations of transmitting HARQ-ACK and SR comprising transmitting the SR and/or HARQ-ACK, and discarding uplink signals other than the SR and/or the urgent HARQ-ACK, or, transmitting the SR and/or the urgent HARQ-ACK by puncturing time-frequency resources that transmit uplink signals other than the SR and/or HARQ-ACK.

Preferably, the operations of transmitting HARQ-ACK and SR comprising for Semi-persistent scheduling (SPS), selecting the PUCCH resource in one PUCCH format from multiple PUCCH resources in different PUCCH formats configured by the SPS to transmit the HARQ-ACK and SR.

Preferably, when transmitting the HARQ-ACK and SR, transmission power is adjusted by a parameter $\Delta_{F\_PUCCH}(F)$, and/or transmission power is adjusted by a parameter $\Delta_{PUCCH\_TF,c}(i)$, wherein, $\Delta_{F\_PUCCH}(F)$ is the power offset parameter associated with a PUCCH format and $\Delta_{PUCCH\_TF,c}(i)$ is the power parameter at least associated with the number of bits of the UCI.

In accordance with another aspect of the disclosure, a method for setting uplink time advance (TA) is provided. The method includes for one UE, configuring the TA as $N_{TA}^+ = N_{TA},\text{prop}^+ + N_{TA},\text{offset}^+$, wherein, $N_{TA},\text{prop}^+$ is the necessary TA to align an uplink slot and a downlink slot, and $N_{TA},\text{offset}^+$ is an additional TA, for another UE, configuring the TA as $N_{TA}^- = N_{TA},\text{prop}^- - N_{TA},\text{offset}^-$, wherein, $N_{TA},\text{prop}^-$ is the necessary TA to align an uplink slot and a downlink slot, and $N_{TA},\text{offset}^-$ is a decreased TA, wherein, the sum of $N_{TA},\text{offset}^+$ and $N_{TA},\text{offset}^-$ is equal to an integer multiple of the slot length.

In accordance with another aspect of the disclosure, a UE is provided. The UE includes a PUCCH resource allocating module and an uplink signal multiplexing module, wherein the PUCCH resource allocating module, configured for determining a PUCCH resource for transmitting HARQ-ACK and/or SR, and the uplink signal multiplexing module, configured for determining, by the UE, the occupied PUCCH resource and transmitting HARQ-ACK and SR according to the SR resource configured on one time resource and whether it is necessary to transmit the SR currently.

By adopting the method of the disclosure, the performance of transmitting up to two bits of UCI using a SPUCCH is optimized, the multiplexing of SR with other UCI and/or physical uplink shared channel (PUSCH) is better supported, and the transmission performance is improved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 is a flowchart according to an embodiment of the disclosure;

FIG. 3 is a flowchart for selecting a physical uplink control channel (PUCCH) format according to a number of bits of hybrid automatic repeat request acknowledgement (HARQ-ACK) according to an embodiment of the disclosure;

FIG. 4 is a flowchart for selecting a PUCCH format according to a total number of uplink control information (UCI) bits according to an embodiment of the disclosure;

Throughout the drawings, it should be noted that like reference numbers are used to depict the same or similar elements, features, and structures.

DETAILED DESCRIPTION

Figure 1:
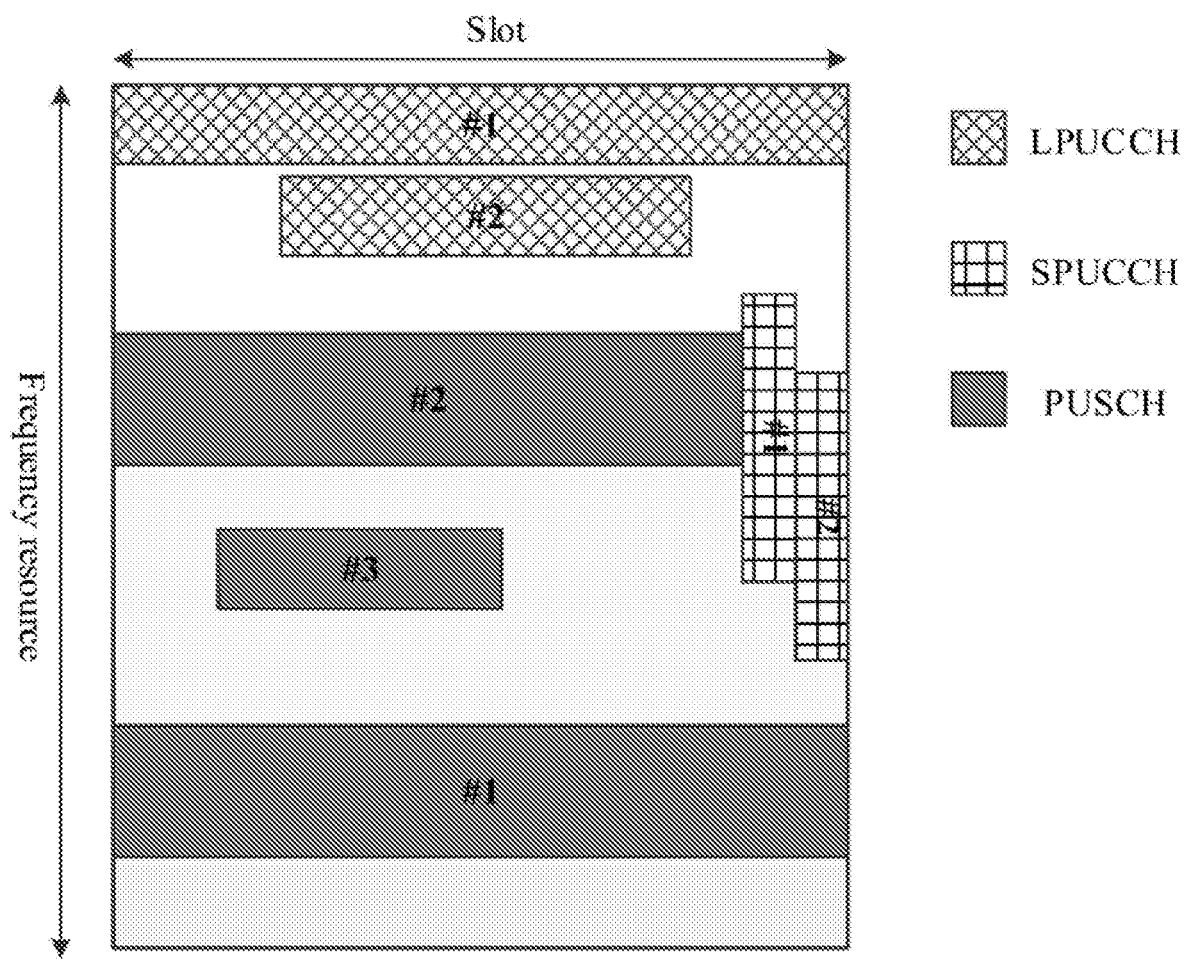
FIG. 1 is a channel multiplexing structure of an uplink slot according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

With the rapid development of the information industry, especially the growing demand from the mobile internet and internet of things (or IoT for short), it poses an unprecedented challenge to the future of mobile communication technology. In order to meet this unprecedented challenge, the communication industry and academia have launched a broad fifth generation (5G) mobile communication technology research for 2020. According to the work project of 3rd generation partnership project (3GPP) organization, work on the first phase of 5G is in progress.

Downlink transmission refers to transmission of a signal from a base station to a user equipment (UE). The downlink signal includes a data signal, a control signal, and a reference signal (pilot). Here, the base station transmits downlink data in a physical downlink shared channel (PDSCH) or transmits downlink control information (DCI) in a downlink control channel. Uplink transmission refers to transmission of a signal from a UE to a base station. The uplink signal also includes a data signal, a control signal, and a reference signal. Here, the UE transmits uplink data in a physical uplink shared channel (PUSCH) or transmits uplink control information (UCI) in a physical uplink control channel (PUCCH). The base station may dynamically schedule the PDSCH transmission and the PUSCH transmission of the UE through a physical downlink control channel (PDCCH). UCI carried on the PUCCH can be classified into various types, including hybrid automatic repeat request (HARQ) acknowledgment information (HARQ-ACK), channel status indication (CSI) information, scheduling request (SR) and the like.

5G systems still support multiple inputs multiple outputs (MIMO) transmission. When operating in MIMO transmission mode, multiple transmission blocks (TBs) may be scheduled simultaneously on one carrier. For example, for an initial transmission, only one TB is scheduled when the number of layers in MIMO transmission is less than or equal to 4. When the number of layers is greater than 4, two TBs are scheduled. Or, for retransmission, it is also possible to schedule two TBs even if the number of layers is less than or equal to 4. Of course, the number of TBs actually scheduled each time by the base station is dynamically variable. In addition, 5G still supports carrier aggregation in order to flexibly utilize each spectrum resource. For example, the base station may configure multiple carriers for one UE.

In a 5G system, the length of a time unit for uplink and downlink transmission is variable whether it is a frequency division duplex or frequency division duplex (FDD) or time division duplex (TDD) system. The time unit is sometimes referred to as a time resource, such as a slot, mini-slot, or the like.

FIG. 1 is a channel multiplexing structure of an uplink slot according to an embodiment of the disclosure.

Referring to FIG. 1, this is a schematic diagram of resource allocation in an uplink slot. For a PUCCH, it can occupy only one or two OFDM symbol. This structure facilitates fast feedback of HARQ-ACK information and reduces the number of parallel HARQ processes, which can generally be referred to as a short PUCCH (SPUCCH). Another PUCCH structure is mapped onto N OFDM symbols, e.g., N is greater than or equal to 4, which can generally be referred to as a long PUCCH (LPUCCH). Because of the large number of OFDM symbols, a LPUCCH can carry more information bits and has a large coverage area. For PUSCH, it can be all OFDM symbols occupying one slot, or occupying OFDM symbols other than the last one or more OFDM symbols for SPUCCH, or occupying a part of OFDM symbols within a slot, i.e., equivalent to a mini slot.

For SPUCCH, in the case where the number of bits of HARQ-ACKs carried is one or two bits, the base station allocates two or four SPUCCH sequences to the UE to indicate one or two bits, respectively, according to the progress of 3GPP. For example, the one SPUCCH sequence can refer to one sequence transmitted on one physical resource block (PRB), which can be obtained based on one cyclic offset (CS) of one root sequence. For SR, since the UE indicates that the SR is transmitted only when there is a need for uplink transmission, the base station can allocate only one SPUCCH sequence as one SR resource. For LPUCCH, in the case where the number of bits of HARQ-ACKs carried is one or two bits, a method similar to long term evolution (LTE) can multiplex multiple channels in both the time domain and the code domain, i.e., multiple orthogonal spreading codes (OCCs) are configured in time, and different CS of the same root sequence are employed. Similar to LTE, one of the above LPUCCH resources can be used as an SR resource. According to the progress of 3GPP, a base station can configure multiple SR resources for a UE. For example, these SR resources can represent different services, respectively. The periods and offsets of different SR resources can be different.

It is not difficult to see that in a 5G system, both from the downlink scheduling point of view and the uplink feedback UCI point of view, dimensions are newly added relative to LTE. Therefore, how to design a downlink scheduling signaling and how to design a UCI feedback mechanism, so that the uplink and downlink control signaling overhead is reasonable, and does not affect the flexibility of scheduling, there is an urgent need for a new scheme.

In order to make the objects, technical solutions and advantages of the disclosure more clearly understood, the disclosure will be described in further detail below with reference to the accompanying drawings and examples.

FIG. 2 is a flowchart according to an embodiment of the disclosure.

Referring to FIG. 2, in Operation 201, a UE determines PUCCH resources for transmitting UCI information, such as HARQ-ACK and/or SR.

PUCCH can be divided into SPUCCH and LPUCCH according to the number of occupied OFDM symbols. In addition, the PUCCH format carrying less than or equal to two bits and the PUCCH format carrying more than two bits are different according to the carried number of bits. In particular, the SPUCCH may carry information by allocating a SPUCCH sequence, for example, two SPUCCH sequences can be allocated to carry one UCI bit, and four SPUCCH sequences can be configured to carry two UCI bits. For example, the one SPUCCH sequence can refer to one sequence transmitted on a frequency unit that can refer to a PRB, the sequence can be obtained based on one CS of one root sequence. Within one frequency unit, it can be possible to support at most N CSs for one root sequence, for example, N equals 12. In general, the number of CSs that can be occupied within one frequency unit depends on the delay extension of a channel. When the delay extension is large, the simultaneous use of neighboring CSs can cause mutual interference and degrade performance. The larger the interval between the CSs used simultaneously, the smaller the interference. In general, when it is necessary to feed one bit back, the CS interval of the two SPUCCHs can be N/2, and when it is necessary to feed two bits back, the CS interval of the two SPUCCHs can be N/4.

The base station can configure multiple SR resources for the UE. For example, these SR resources can represent different services, respectively. The periods and offsets of different SR resources can be different so that on one time resource (slot, mini-slot, one or more OFDM symbols), SR resources are not configured, only one SR resource is configured, or multiple SR resources are configured. Assuming that the period of SR is short, for example, one OFDM symbol, there may also be multiple transmission opportunities corresponding to one SR resource within the above-mentioned one time resource. By employing SPUCCH, one SPUCCH sequence can be allocated to one SR resource. The UCI information cannot be limited to HARQ-ACK and SR, but can also include information, such as CSI or the like. According to 3GPP discussion, PUCCH format 0 is an SPUCCH format and can carry one or two bits, PUCCH format 1 is an LPUCCH format and can carry one or two bits, PUCCH format 2 is an SPUCCH format and carries more than two bits, PUCCH formats 3 and 4 are both LPUCCH formats and carry more than two bits. PUCCH formats that carry less than or equal to two bits, such as PUCCH formats 0 and 1, actually can also be used to carry UCI information that exceeds two bits. For example, for PUCCH format 0, by increasing the number of allocated PUCCH sequences, for example, by allocating 8 SPUCCH sequences which can carry 3 bits of UCI.

The PUCCH resources of the UE can be implicitly determined, e.g., the mapped PUCCH resources are obtained according to the index of the minimum control channel element (CCE) of the PDCCH. Or, one PUCCH resource can be configured for UCI transmission using a high layer signaling, or, M PUCCH resources can be configured by using the high layer signaling, and at this time, one of the M resources can be dynamically indicated in DCI, for example, ceil($\log_2(M)$) bits are occupied in DCI.

Operation 202: The UE transmits uplink information, such as the HARQ-ACK and SR and the like according to the number of uplink scheduling request SR resources configured on one time resource and whether it is necessary to transmit an SR currently.

The uplink information can include the HARQ-ACK, CSI, SR and/or PUSCH, or the like. The UE determines the occupied PUCCH resources according to the SR resources configured on one time resource and whether it is necessary to transmit an SR currently. When it is necessary to feed the CSI (P-CSI) back, UCI information can be transmitted on PUCCH resources configured for P-CSI transmission. When it is necessary to feed the HARQ-ACK back, it can be one of the above M PUCCH resources configured by using the high layer signaling which is dynamically indicated by using a DCI, thereby transmitting UCI information on this PUCCH resource. When there is a PUSCH, SR and/or HARQ-ACK may need to puncture the PUSCH if there is not enough processing time from the generation of the SR and/or HARQ-ACK to the PUSCH transmission.

The method for transmitting UCI according to the disclosure will be described with reference to various embodiments.

Embodiment 1

When it is necessary to carry one bit of UCI information, one SPUCCH resource consists of two SPUCCH sequences. The CS of the first SPUCCH sequence is K, and the CS of the second SPUCCH sequence can be $k+K_0$, for example, $K_0=N/2$. Because the SPUCCH sequences are allocated in pairs, it can be necessary to indicate only N/2 possibilities for one frequency unit, or, N possibilities can be indicated, i.e., the CS of the first sequence is allowed to take all N possible values. Assuming that N is equal to 12, Table 1 is a mapping method from one bit of UCI information to two SPUCCH sequences.

TABLE 1

Mapping relation from one bit of UCI information to two SPUCCH sequences

| HARQ-ACK 0 | CS |
|---|---|
| ACK | k + 6 |
| NACK | k |

When it is necessary to carry at most two bits of UCI information, one SPUCCH resource consists of four SPUCCH sequences. Preferably, it is possible to divide the four SPUCCH sequences of the one SPUCCH resource into two groups, each of which has two SPUCCH sequences capable of constituting one SPUCCH resource carrying one bit of UCI information. For one SPUCCH resource, if the CS of the first SPUCCH sequence is k, then CS of the other three SPUCCH sequences can be $mod(k+K_1 \cdot j, N)$, j=1, 2, 3, for example, $K_1=N/4$. At this time, two SPUCCH sequences which corresponding to the CS k and $mod(k+N/2, N)$ constitute a SPUCCH resource carrying one bit of UCI information, the two SPUCCH sequences corresponding to CS $mod(k+N/4, N)$ and $mod(k+3N/4, N)$ constitute another SPUCCH resource carrying one bit of UCI information.

TABLE 2

Mapping relation from two bits of UCI information to four SPUCCH sequences

| HARQ-ACK 0 | HARQ-ACK 1 | CS |
|---|---|---|
| ACK | NACK | k + 9 |
| ACK | ACK | k + 6 |
| NACK | ACK | k + 3 |
| NACK | NACK | k |

When it is actually necessary to transmit two bits, for example correspondingly scheduling the DCI of two TBs, and all four SPUCCH sequences of the above-mentioned one SPUCCH resource may be occupied. Table 2 is a mapping method from two bits of UCI information to four SPUCCH sequences. When it is actually necessary to transmit one bit, for example, only one of the two TBs in the DCI is enabled or only a single TB transmission is supported in fallback DCI, and can be two of the four SPUCCH sequences occupying only one SPUCCH resource. Here, it is possible to make the two occupied SPUCCH sequences to constitute one SPUCCH resource carrying one bit of UCI information. The interval of CSs of the two occupied SPUCCH sequences can be equal to $K_0$. The CSs of the two SPUCCH sequences for carrying one bit of information are k and $mod(k+N/2, N)$ respectively, or $mod(k+N/4, N)$ and $mod(k+3N/4, N)$. For example, the two occupied SPUCCH sequences satisfy Table 1. With this method, the CS interval of the two occupied SPUCCH sequences can also be maximized. This method can also be seen as repeatedly mapping one bit of HARQ-ACK to HARQ-ACK 0 and HARQ-ACK 1 of Table 2, i.e., (NACK, NACK) and (ACK, ACK), and then obtaining the mapped SPUCCH sequence. With this method, when transmitting one bit, two unoccupied SPUCCH sequences can constitute one SPUCCH resource carrying one bit of UCI information, so that the base station can dynamically allocate the two unoccupied SPUCCH sequences to another UE transmitting one bit of UCI information.

For a case where it is necessary to carry at most to two bits of UCI, only N/4 possibility can be indicated for one frequency unit. Assuming that M SPUCCH resources are configured by using a high layer signaling, it is beneficial to reduce the signaling overhead of configuring the M SPUCCH resources by using the high layer signaling. The CS k of the first PUCCH sequence of the N/4 PUCCH resources can be taken as a value k=0, 1 . . . N/4−1. With this method, when it is actually necessary to feed only one bit back, corresponding to the N/4 PUCCH resources the SPUCCH sequence CSs actually used are 0, 1, . . . N/4 and N/2, N/2+1, . . . 3N/4−1. The minimum interval of the CSs actually used above is 1, which may not be beneficial to reduce interference. The disclosure further proposes that when selecting the CS of the first PUCCH sequence of the above-mentioned PUCCH resource, it is necessary to maximize the interval of all the actually possible CCs in the case where only one bit is fed back. For example, the CS k of the first SPUCCH sequence of the above N/4 SPUCCH resources can be taken as values k=2j or k=4j, j=0, 1, . . . N/4−1. With this method, when it is necessary to feed only one bit back, corresponding to the N/4 PUCCH resources, the minimum interval of the actually used SPUCCH sequence CS is 2 corresponding to the N/4 PUCCH resources, which is beneficial to reduce interference.

Or, in the case where it is necessary to carry a maximum of two bits of UCI, one frequency unit can still be indicated with a possible N/2 SPUCCH resources, for example, the CS k of the first SPUCCH sequence of the above N/2 SPUCCH resources can be taken as a value k=0, 1, . . . N/2−1. With this method, when it is actually necessary to transmit two bits, since only N/4 non-conflicting resources are available, resource collisions between different UEs are avoided by the base station. When it is actually necessary to feed only one bit back, corresponding to above-mentioned N/2 SPUCCH resources, N/2 non-collision SPUCCH resources carrying one bit of information can be obtained, so that as many UEs as possible are multiplexed on one frequency unit, and the SPUCCH resource overhead is reduced.

In the above method, the HARQ-ACK information mapped by the SPUCCH sequence with the same index of the SPUCCH resource is fixed. For example, according to Table 1, the second sequence (CS mod(k+N/2, N)) of the SPUCCH resource is always mapped to ACK, and according to Table 2, the first sequence (CS k) of the SPUCCH resource is always mapped to (NACK, NACK). When the value of the CS k of the first sequence of the SPUCCH resource is some continuous values, this causes the CS interval of the SPUCCH sequence representing the same HARQ-ACK information is only 1. In general, the probability that the UE transmits ACK is much higher than that of NACK, and in the method of Table 1, each UE tends to occupy CS 0-5 instead of CS 6-11. The actual occupied CS interval of each UE is small, resulting in increased mutual interference and decreased performance.

The disclosure proposes to alternately change the HARQ-ACK information mapped by the PUCCH sequence with the same index for different SPUCCH resources. For example, for a SPUCCH resource having CS of the first PUCCH sequence is k, HARQ-ACK information mapped by each PUCCH sequence of a SPUCCH resource is adjusted according to an odd or even number of k. As shown in Table 3-1, k=0, 1, . . . N/2−1, for one bit of UCI information, when CS is even, CS k and k+6 are mapped to NACK and ACK, respectively, when CS is odd, CS k and k+6 are mapped to ACK and NACK, respectively. Or, as shown in Table 3-2, k=0, 1, . . . N−1, for one bit of UCI information, when CS is even, CS k and k+3 are mapped to NACK and ACK, respectively, when CS is odd, CS k and k+3 are mapped to ACK and NACK, respectively. With this method, the CS interval of the PUCCH sequence for indicating one bit of UCI information is 3. As shown in Table 4, k=0, 1, . . . N/4−1, or k=0, 1, . . . N/2−1 for two bits of UCI information, when CS is even, CS k, k+3, k+6, and k+9 are mapped to (NACK, NACK), (NACK, ACK), (ACK, ACK), and (ACK, NACK), respectively, when CS is odd, CS k, k+3, k+6, and k+9 are mapped to (ACK, ACK), (ACK, NACK), (NACK, NACK) and (NACK, ACK), respectively.

TABLE 3-1

Mapping relation from one bit of UCI information to SPUCCH sequences

| HARQ-ACK 0 | CS k is even | CS k is odd |
|---|---|---|
| ACK | k + 6 | k |
| NACK | k | k + 6 |

TABLE 3-2

Mapping relation from one bit of UCI information to SPUCCH sequences

| HARQ-ACK 0 | CS k is even | CS k is odd |
|---|---|---|
| ACK | k + 3 | k |
| NACK | k | k + 3 |

TABLE 4

Mapping relation from 2 bits of UCI information to SPUCCH sequences

| HARQ-ACK 0 | HARQ-ACK 1 | CS k is even | CS k is odd |
|---|---|---|---|
| ACK | NACK | k + 9 | k + 3 |
| ACK | ACK | k + 6 | k |
| NACK | ACK | k + 3 | k + 9 |
| NACK | NACK | k | k + 6 |

Or, the value of the CS k of the first sequence of the SPUCCH resource can be made to be only even or only odd. Thus, the CS interval of the SPUCCH sequences representing the same HARQ-ACK information is 2. For example, assuming that the value of CS k is 2j, j=0, 1, . . . N/2−1, and assuming that $K_0=N/4$, then the CS interval of the two SPUCCH sequences of the SPUCCH resource indicating one bit of UCI information is 3.

Embodiment 2

In a LTE system, the PUCCH carrying one or two HARQ-ACK bits and the PUCCH carrying SR are both based on coherent reception. When HARQ-ACK resources are allocated as well as SR resources in one subframe, the HARQ-ACK information is transmitted on the PUCCH allocated for HARQ-ACK transmission in the case where it is unnecessary to request uplink resources, and the HARQ-ACK information is transmitted on the PUCCH allocated for SR transmission in the case where it is necessary to request uplink resources. However, the method of multiplexing HARQ-ACK and SR in LTE cannot be employed for the SPUCCH channel carrying one or two bits of information in the 5G system. This is because when HARQ-ACK is not considered, the SR resource allocates only one SPUCCH sequence, which is not capable of carrying one or two HARQ-ACK bits.

For one or two bits of HARQ-ACK information, assuming that the method for allocating SPUCCH resource is to first configure M SPUCCH resources by using a high layer signaling and dynamically indicate one of the above M resources in DCI, for example, occupying ceil($\log_2$(M)) bits in DCI.

Each of these SPUCCH resources consists of two SPUCCH sequences when it is necessary to carry at most one bit of HARQ-ACK information. The CS of the first SPUCCH sequence is k, and the CS of the second SPUCCH sequence can be $k+K_0$, for example, $K_0=N/2$. Table 1 is a mapping method from one bit of HARQ-ACK information to two SPUCCH sequences. Each of these SPUCCH resources consists of four SPUCCH sequences when it is necessary to carry at most two bits of HARQ-ACK information. Preferably, it is possible to divide the four SPUCCH sequences of the one SPUCCH resource into two groups, each of which has two SPUCCH sequences capable of constituting one SPUCCH resource carrying at most one bit of UCI information. For one SPUCCH resource, if the CS of the first SPUCCH sequence is k, then CS of the other three SPUCCH sequences can be mod(k+$K_1$·j, N), wherein, j=1, 2, 3, for example, $K_1=N/4$. Table 2 is a mapping method from two bits of UCI information to four SPUCCH sequences.

The method for allocating SPUCCH resources for transmission of HARQ-ACK and SR according to the disclosure is described below.

The method of configuring M SPUCCH resources by using a high layer signaling and dynamically indicating one of the M resources by using the DCI can be such that the high layer signaling configures the SPUCCH resources according to the need to multiplex HARQ-ACK and SR in one time unit. The SPUCCH resource configured by the above-mentioned high layer signaling includes both a SPUCCH resource for transmitting HARQ-ACK when it is unnecessary to request uplink resources, and a SPUCCH resource for transmitting HARQ-ACK when it is necessary to request uplink resources.

When carrying one bit of HARQ-ACK, each SPUCCH resource configured by the above-mentioned high layer signaling includes four SPUCCH sequences, two for cases where it is unnecessary to request uplink resources, and the other two for cases where it is necessary to request uplink resources. The above-mentioned SPUCCH resource consisting of four SPUCCH sequences is actually two SPUCCH resources that can carry one bit. The above-mentioned four SPUCCH sequences can be located in the same frequency unit or different frequency units. For example, two sequences for cases where it is unnecessary to request uplink resources are located at frequency unit F1, and the other two sequences for cases where it is necessary to request uplink resources are located at frequency units F2, and F1 and F2 are different. When carrying at most two bits of HARQ-ACK, each SPUCCH resource configured by the above high layer signaling includes eight SPUCCH sequences, wherein, four are used for cases where it is unnecessary to request uplink resources, and the other four are used for cases where it is necessary to request uplink resources. Thus, the SPUCCH resource consisting of eight SPUCCH sequences is actually two SPUCCH resources capable of carrying two bits. The eight SPUCCH sequences can be located in the same frequency unit or different frequency units. For example, four sequences for cases where it is unnecessary to request uplink resources are located at frequency unit F1, and the other four sequences for cases where it is necessary to request uplink resources are located at frequency units F2, and F1 and F2 are different. In one time unit, if the SR resource is not configured, that is, when the UE only needs to transmit HARQ-ACK information, corresponding to one of the SPUCCH resources configured by the high layer signaling, the number of the SPUCCH sequences contained in the SPUCCH resource is A, and HARQ-ACK information can be carried by occupying A/2 of the SPUCCH sequences. For example, the A/2 SPUCCH sequences are the A/2 SPUCCH sequences for cases where it is unnecessary to request uplink resources.

Figure 5:
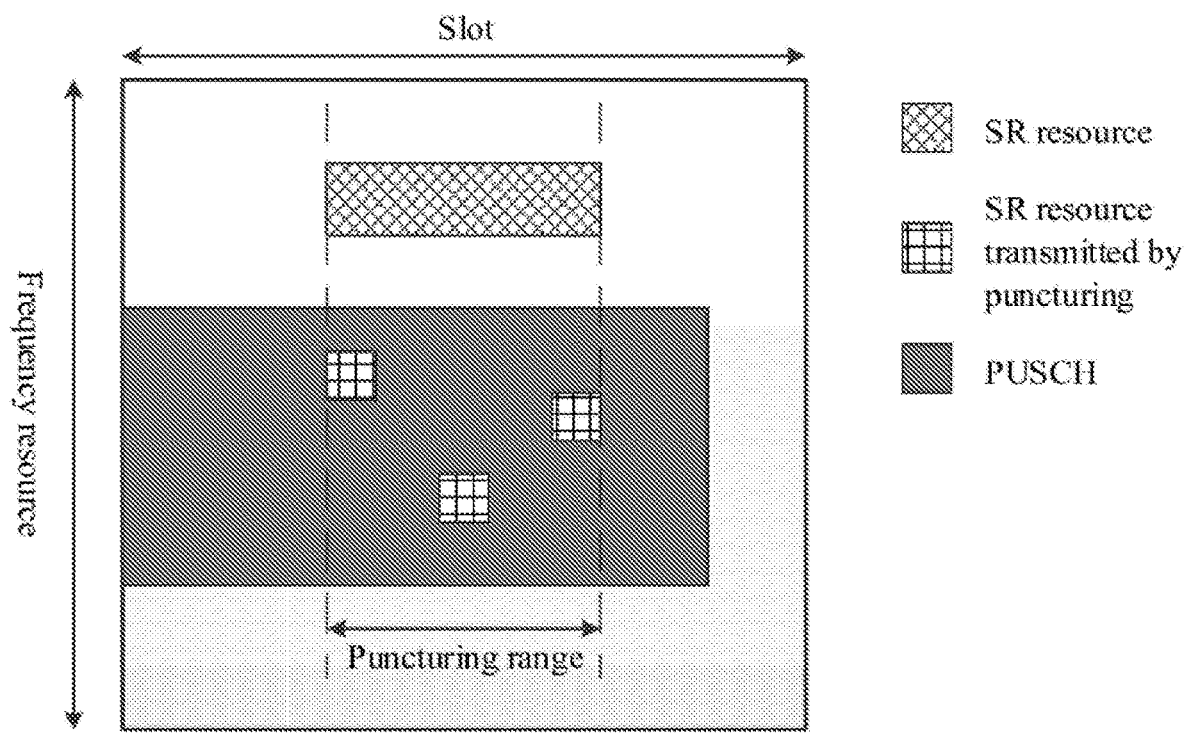
FIG. 5 is a schematic diagram of a puncturing range according to an embodiment of the disclosure.

In one time unit, if SR resources are configured, for cases of carrying at most 2 bits of HARQ-ACK, as shown in FIG. 5, when it is actually necessary to transmit 2 bits of HARQ-ACK, for example, correspondingly scheduling DCI of two TBs, all the eight SPUCCH sequences configured by the high layer signaling may be employed according to whether it is necessary to request uplink resources. In Table 5, when the eight SPUCCH sequences occupy the same frequency unit, the CS interval is only 1. When it is actually necessary to transmit one bit of HARQ-ACK, for example, if only one of the two TBs in DCI is enabled or only supports a single TB transmission in a fallback DCI, only four of the eight SPUCCH sequences may be occupied to carry one bit of HARQ-ACK and one SR. The four SPUCCH sequences can include two of the four SPUCCH sequences for cases where it is unnecessary to request uplink resources and two of the four SPUCCH sequences for cases where it is necessary to request uplink resources. With this method, the CS interval of the currently occupied four SPUCCH sequences is still 1. Or, the four SPUCCH sequences can be the four SPUCCH sequences for the cases where it is unnecessary to request uplink resources, or the four SPUCCH sequences for the cases where it is necessary to request uplink resources. In particular, the four SPUCCH sequences are the same as the four SPUCCH sequences occupied in the cases where SR resources are not configured within one time unit. Because the four selected SPUCCH sequences were originally used for carrying 2 bits of HARQ-ACK information, the CS of the four SPUCCH sequences are spaced more widely. As shown in Table 6 and Table 7, the minimum CS interval is 3, which beneficial to reduce the interference and optimize performance. In addition, the four unused SPUCCH sequences are also used for carrying 2 bits of HARQ-ACK information, thereby facilitating the base station to allocate the four unused SPUCCH sequences to other UEs for use.

TABLE 5

Multiplexing two bits of HARQ-ACK and one SR

| HARQ-ACK 0 | HARQ-ACK 1 | SR | CS |
| --- | --- | --- | --- |
| ACK | NACK | No request | k + 9 |
| ACK | ACK | No request | k + 6 |
| NACK | ACK | No request | k + 3 |
| NACK | NACK | No request | k |
| ACK | NACK | Request | k + 10 |
| ACK | ACK | Request | k + 7 |
| NACK | ACK | Request | k + 4 |
| NACK | NACK | Request | k + 1 |

TABLE 6

Multiplexing one bit of HARQ-ACK and one SR

| HARQ-ACK 0 | SR | CS |
| --- | --- | --- |
| ACK | No request | k + 6 |
| NACK | No request | k |
| ACK | Request | k + 9 |
| NACK | Request | k + 3 |

TABLE 7

Multiplexing one bit of HARQ-ACK and one SR

| HARQ-ACK 0 | SR | CS |
| --- | --- | --- |
| ACK | Request | k + 9 |
| ACK | No request | k + 6 |
| NACK | No request | k + 3 |
| NACK | Request | k |

In Table 6, two SPUCCH sequences are mapped in accordance with the method of transmitting one bit of HARQ-ACK information, according to whether it is necessary to request uplink resources. In Table 7, SR can be considered as one HARQ-ACK bit, thus mapping to four SPUCCH sequences according to the method of 2 bits of HARQ-ACK information. Here, because the probability that the UE needs to occupy SR resources to request uplink resources is low, the "Request" can be mapped to NACK and the "No request" can be mapped to ACK. By employing the method of Table 7, the transmission performance can be improved as much as possible.

Embodiment 3

For LPUCCH, similar to LTE, both LPUCCH carrying one or two HARQ-ACK bits and LPUCCH carrying SR are based on coherent reception. When HARQ-ACK resources are allocated as well as SR resources on one time resource (a slot, a mini slot, one or more OFDM symbols), HARQ-ACK information is transmitted on the LPUCCH allocated for HARQ-ACK transmission for the case where it is unnecessary to request uplink resources, and HARQ-ACK information is transmitted on the LPUCCH allocated for SR transmission for the case where it is necessary to request uplink resources.

According to embodiment 2, one or two bits of HARQ-ACK and one SR can be multiplexed by increasing a SPUCCH sequence. When it is necessary to multiplex one bit of HARQ-ACK information and one SR, it is necessary to allocate four SPUCCH sequences, and when it is necessary to multiplex two bits of HARQ-ACK information and one SR, it is necessary to allocate eight SPUCCH sequences. When it is necessary to multiplex two bits of HARQ-ACK information and one SR, since eight SPUCCH sequences are needed, on one hand, the utilization rate of uplink resources is reduced, and on the other hand, assuming that the eight SPUCCH sequences are located in the same frequency unit, the minimum value of the CS interval is only 1, which is not beneficial to ensure transmission performance. Another possible method is to first perform an "AND" operation on the two bits of HARQ-ACK information to obtain one bit, thus making up two bits with one bit of SR for transmission, so that only four SPUCCH sequences need to be occupied. This method reduces resource overhead, but also sacrifices the transmission performance of downlink data.

In fact, in the 5G system, not only a PUCCH format that can carry only one or two bits is defined, but also a PUCCH format that can carry more than two bits is defined. The number of bits of HARQ-ACKs that currently require to be fed back is L, and L is greater than or equal to 1. The L bits of HARQ-ACK and SR information can be transmitted simultaneously on the PUCCH format carrying more than two bits. The total number of bits of UCI is U, and U is greater than or equal to L.

When allocating PUCCH resources, at least one group of PUCCH resources carrying less than or equal to two bits of PUCCH formats can be configured by a higher layer signaling and at least one group of PUCCH resources carrying greater than two bits of PUCCH formats can be configured. By determining a necessary PUCCH format on one time unit according to UCI information to be fed back currently, thereby a groups of PUCCH resources are determined, and then, one of the selected group of PUCCH resources is dynamically indicated by using the HARQ-ACK resource indication (ARI) in the DCI. For PUCCH formats that carry less than or equal to two bits, it is possible to configure only one group of PUCCH resources, which can include PUCCH format 0 and/or PUCCH format 1. Or, for PUCCH formats that carry less than or equal to two bits, two groups of PUCCH resources can be configured, one group of resources including PUCCH format 0 only, and the other group of resources only including PUCCH format 1. For the PUCCH format carrying more than two bits, one or more groups of PUCCH resources can be configured, each group of resources can include one or more of PUCCH format 2, PUCCH format 3 and PUCCH format 4. Or, for the PUCCH format carrying more than two bits, one or more groups of PUCCH resources can be configured, each group of resources can include only one of PUCCH format 2, PUCCH format 3 and PUCCH format 4. The method for determining the PUCCH format for carrying UCI according to the disclosure is described below.

Assuming that the base station configures M SR resources for the UE, the periods and offsets of different SR resources can be the same or different, and M is greater than or equal to 1. Depending on the periods and offsets of the M SR resources, on one time resource, the number of SR resources actually configured for the UE is K, and K is greater than or equal to 0 and less than or equal to M. When K is equal to 0, i.e., there is no need to transmit SR on this time resource, L bits of HARQ-ACK can be transmitted in PUCCH format configured by the base station. This PUCCH format can be determined according to L or according to the total number of bits U of UCI.

Assuming that only one SR resource is configured on one time resource, that is, K is equal to 1, it is equivalent to that it is necessary to transmit one bit of SR information. The following describes the method for multiplexing transmission of UCI on this time resource.

The first method is that when L is less than or equal to 2, the base station allocates the PUCCH format carrying two bits to the UE, so that the UE transmits L bits of HARQ-ACK and SR using the PUCCH format carrying two bits. For SPUCCH, the disclosure is not limited to the method for increasing the SPUCCH sequences, or the method for performing an AND operation on HARQ-ACK, or the multiplexing of processing HARQ-ACK and SR by other methods. When L is greater than 2, the base station allocates the PUCCH format carrying more than two bits to the UE, thereby transmitting L bits of HARQ-ACK and SR information on the PUCCH format carrying more than two bits. This method can be used for the cases of feedback of only HARQ-ACKs and/or SRs.

Generally, within one time unit, other UCI information, such as P-CSI, can be included in addition to HARQ-ACK and/or SR to be fed back. When it is necessary to feed only HARQ-ACK and SR back, and L is equal to 1 or 2, the base station allocates the PUCCH format carrying two bits to the UE, so that the UE transmits HARQ-ACK and SR using the PUCCH format carrying two bits, when it is necessary to feed the UCI other than HARQ-ACK and SR, or when L is greater than 2, the base station allocates the PUCCH format carrying more than two bits to the UE, thereby transmitting UCI on the PUCCH format carrying more than two bits. Or, the number of UCI bits excluding the SR is V, and the multiplexing can be processed according to V. When V is less than or equal to 2, L is equal to 1 or 2, and the base station allocates the PUCCH format carrying two bits to the UE, so that the UE transmits UCI using the PUCCH format carrying two bits, when V is greater than 2, the base station allocates the PUCCH format carrying more than two bits to the UE, thereby transmitting UCI on the PUCCH format carrying more than two bits. Or, the total number of bits of the UCI is U, and UCI multiplexing can be processed according to U. When U is less than or equal to 3 and L is equal to 1 or 2, the base station allocates the PUCCH format carrying two bits to the UE, so that the UE transmits UCI using the PUCCH format carrying two bits, when U is greater than 3, or L is greater than 2, the base station allocates the PUCCH format carrying more than two bits to the UE, thereby transmitting UCI on the PUCCH format carrying more than two bits.

FIG. 3 is a flowchart for selecting a PUCCH format according to a number of bits of HARQ-ACK according to an embodiment of the disclosure.

Referring to FIG. 3, a determination is made according to L at operation 301, only when L is equal to 1 at operation 302, i.e., HARQ-ACK and SR are two bits in total, the base station allocates the PUCCH format carrying two bits to the UE, so that the UE transmits the L bits of HARQ-ACK and SR using the PUCCH format carrying two bits. With this method, only four SPUCCH sequences are necessary for SPUCCH, which reduces the overhead of SPUCCH and ensures the transmission performance. When L is greater than 1 at operation 303, the base station allocates the PUCCH format carrying more than two bits to the UE, thereby transmitting L bits of HARQ-ACK and SR information on the PUCCH format carrying more than two bits. Assuming that SR resources are not configured on one time resource, when L is less than or equal to 2, the base station allocates the PUCCH format carrying less than or equal to two bits for transmitting L bits of HARQ-ACK, when L is greater than 2, the base station allocates the PUCCH format carrying more than two bits for transmitting L bits of HARQ-ACK to the UE. Or, assuming that SR resources are not configured on one time resource, in order to be consistent with the method of processing one SR resource configured, when L is equal to 1, the base station allocates the PUCCH format carrying less than or equal to two bits for transmitting L bits of HARQ-ACK to the UE, when L is greater than 1, the base station allocates the PUCCH format carrying more than two bits for transmitting L bits of HARQ-ACK to the UE. This method can be used for the cases of feedback of only HARQ-ACKs and/or SRs.

Generally, within one time unit, UCI information, such as P-CSI, may be included in addition to HARQ-ACK and/or SR that require to be fed back.

When it is only necessary to feed HARQ-ACK and SR back, and L is equal to 1, i.e., HARQ-ACK and SR are two bits in total, the base station allocates the PUCCH format carrying two bits to the UE, so that the UE transmits HARQ-ACK and SR using the PUCCH format carrying two bits, when it is necessary to feed UCI back other than HARQ-ACK and SR, or L is greater than 1, the base station allocates the PUCCH format carrying more than two bits to the UE, thereby transmitting UCI on the PUCCH format carrying more than two bits. Assuming that SR resources are not configured on one time resource, when it is necessary to feed only HARQ-ACK back, and L is equal to 1 or 2, the base station allocates the PUCCH format carrying less than or equal to two bits for transmitting HARQ-ACK to the UE, when it is necessary to feed UCI back other than HARQ-ACK and SR, or L is greater than 2, the base station allocates the PUCCH format carrying more than two bits for transmitting UCI to the UE. Or, assuming that the SR resources are not configured on one time resource, in order to be consistent with the method of processing one SR resource configured, when it is necessary to feed only HARQ-ACK back, and L is equal to 1, the base station allocates the PUCCH format carrying less than or equal to two bits for transmitting HARQ-ACK to the UE; when it is necessary to feed UCI other than HARQ-ACK and SR, or L is greater than 1, the base station allocates the PUCCH format carrying more than two bits for transmitting UCI to the UE.

Or, the number of UCI bits excluding the SR is V, and the multiplexing can be processed according to V. When V is equal to 1, L is equal to 1, and the base station allocates the PUCCH format carrying two bits to the UE, so that the UE transmits HARQ-ACK and SR using the PUCCH format carrying two bits, when V is great than 2, the base station allocates the PUCCH format carrying more than two bits to the UE, thereby transmitting UCI on the PUCCH format carrying more than two bits. Assuming that SR resources are not configured on one time resource, when V is less than or equal to 2, L is equal to 1 or 2, and the base station allocates the PUCCH format carrying less than or equal to two bits for transmitting UCI to the UE, when V is greater than 2, the base station allocates the PUCCH format carrying more than two bits for transmitting UCI to the UE. Or, assuming that SR resources are not configured on one time resource, in order to be consistent with the method of processing one SR resource configured, when V is equal to 1, L is equal to 1, and the base station allocates the PUCCH format carrying less than or equal to two bits for transmitting HARQ-ACK to the UE, when V is greater than 1, the base station allocates the PUCCH format carrying more than two bits for transmitting UCI to the UE.

Or, the total number of bits in UCI is U, and UCI multiplexing can be processed according to U. When U is equal to 2, L is equal to 1, and the base station allocates the PUCCH format carrying two bits for the UE, so that the UE transmits HARQ-ACK and SR using the PUCCH format carrying two bits, when U is greater than 2, the base station allocates the PUCCH format carrying more than two bits to the UE, thereby transmitting UCI on the PUCCH format carrying more than two bits. Assuming that SR resources are not configured on one time resource, when U is less than or equal to 2, L is equal to 1 or 2, and the base station allocates the PUCCH format carrying less than or equal to two bits for transmitting UCI to the UE, when U is greater than 2, the base station allocates the PUCCH format carrying more than two bits for transmitting UCI to the UE. Or, assuming that SR resources are not configured on one time resource, in order to be consistent with the above method of processing one SR resource configured, when U is equal to 1, L is equal to 1, and the base station allocates the PUCCH format carrying less than or equal to two bits for transmitting HARQ-ACK to the UE, when U is greater than 1, the base station allocates the PUCCH format carrying more than two bits for transmitting UCI to the UE.

Assuming that K SR resources are configured on one time resource, K is greater than 1, the method for multiplexing transmission of UCI on this time resource is described below.

Since it is difficult to transmit all UCI information and ensure transmission performance based on the PUCCH format carrying less than or equal to two bits, A DCI could indicate the PUCCH format carrying more than two bits regardless of the actual value of L, so that the UE transmits the UCI information on the PUCCH format carrying more than two bits to ensure the transmission performance. With this method, the information of the K SR resources can be indicated with K bits. For example, the K bits are mapped one by one with the K SR resources on the one time resource. Or, assuming that the UE only needs to indicate an uplink resource request corresponding to one SR resource among the K SR resources, the number of bits of the SR which is necessary to be fed back by the UE may be ceil($\log_2(K+1)$) actually. The total number of bits is L+ceil($\log_2(K+1)$). For example, one codeword of the ceil($\log_2(K+1)$) bits indicate that it is unnecessary to transmit the SR and the other K codewords are mapped one-to-one with K SRs. Or, the SR can be indicated with M bits. For example, the M bits are mapped to the M SR resources one by one, and the bits corresponding to the K SR resources among the M bits can carry valid SR information on the one time resource. Or, assuming that the UE only needs to indicate an uplink resource request corresponding to one SR resource among the M SR resources, the number of bits of SR which is actually necessary to be fed back by the UE may be ceil(log$_2$(M+1)), and the total number of bits is L+ ceil(log$_2$(M+1)). For example, one codeword of the ceil(log$_2$(M+1)) bits indicate that it is unnecessary to transmit the SR currently, and the other M codewords are mapped one-to-one with the M SRs. In particular, when the PUCCH format carrying more than two bits is employed, since each SR resource can allocate an individual bit, it is possible for the UE to simultaneously indicate SR request information corresponding to one or more SR resources.

Or, when L is greater than 2, a DCI could indicate the PUCCH format carrying more than two bits, so that the UE transmits the UCI information on the PUCCH format carrying more than two bits, when L is less than or equal to 2, a DCI could indicate the PUCCH format carrying two bits so that the UE transmits the UCI information on the PUCCH format carrying two bits. Or, when the number of bits of UCI other than SR is greater than 2, a DCI could indicate the PUCCH format carrying more than two bits, so that the UE transmits the UCI information on the PUCCH format carrying more than two bits, when the number of bits of UCI other than SR is less than or equal to 2, a DCI could indicate the PUCCH format carrying two bits, so that the UE transmits the UCI information on the PUCCH format carrying two bits. When the PUCCH format carrying more than two bits is employed, the information of the K SR resources can be indicated using K bits, or, assuming that the UE only needs to indicate an uplink resource request corresponding to one SR resource among the K SR resources, the number of bits of SR which is actually necessary to be fed back by the UE may be ceil(log$_2$(K+1)), or, the SR can be indicate by M bits, or, assuming that the UE only needs to indicate an uplink resource request corresponding to one SR resource among the M SR resources, the number of bits of SR which is necessary to be fed back by the UE actually can be ceil(log$_2$(M+1)).

Or, assuming that the UE only needs to indicate an uplink resource request corresponding to one of the K SR resources, the number of bits which is actually necessary to be fed back by the UE can be L+ ceil(log$_2$(K+1)). Based on the PUCCH format carrying less than or equal to two bits, only when K is equal to Nsr and L is equal to 1, Nsr is equal to 2 or 3, HARQ-ACK and SR can be represented by 3 bits, and there is no UCI other than HARQ-ACK and SR, the base station allocates the PUCCH format carrying two bits to the UE, for example, by employing the method of increasing the SPUCCH sequence, the UE transmits L bits of HARQ-ACK and SR using the PUCCH format carrying two bits, when K is not equal to Nsr or L is not equal to 1, the base station allocates the PUCCH format carrying more than two bits to the UE, so that the UE transmits UCI by employing the PUCCH format carrying more than two bits.

FIG. 4 is a flowchart for selecting a PUCCH format according to a total number of UCI bits according to an embodiment of the disclosure.

Referring to FIG. 4, on one time resource, assuming that it is necessary to feed only HARQ-ACK and SR back, and it is also possible to determine the method of multiplexing transmission of HARQ-ACK and SR based on the total number of bits S of HARQ-ACK and SR at operation 401. With this method, the allocated PUCCH resources can be determined according to the number of bits S.

Or, assuming that the UE only needs to indicate an uplink resource request corresponding to one SR resource among the M SR resources, the number of bits which is actually necessary to be fed back by the UE may be L+ ceil(log$_2$(M+1)). Based on the PUCCH format carrying less than or equal to two bits, only when M is equal to Nsr and L is equal to 1, Nsr is equal to 2 or 3 and HARQ-ACK and SR can be represented by three bits, furthermore, when there is no UCI other than HARQ-ACK and SR, the base station allocates the PUCCH format carrying two bits to the UE, for example, using the method of increasing the SPUCCH sequence, whereby the UE transmits L bits of HARQ-ACK and SR using the PUCCH format carrying two bits, when M is not equal to Nsr or L is not equal to 1, the base station allocates the PUCCH format carrying more than two bits to the UE, so that the UE transmits UCI using the PUCCH format carrying more than two bits. As shown in FIG. 4, on one time resource, assuming that only it is necessary to only feed HARQ-ACK and SR back, and it is also possible to determine the method for multiplexing transmission of HARQ-ACK and SR at operation 401 according to the total number of bits S of HARQ-ACK and SR. With this method, the allocated PUCCH resources can be determined according to the number of bits S.

Assuming that the number of SR resources actually configured for the UE on one time resource is K, K is greater than or equal to 0, and K is less than or equal to M, and an individual bit can be configured to each SR resource, the total number of bits is S=L+K. Or, assuming that the UE only needs to indicate the uplink resource request corresponding to one SR resource among the K SR resources, the number of SR bits which is actually necessary to be fed back by the UE can be f(K)=ceil(log$_2$(K+1)), and the total number of bits is S=L+f(K). Or, when K is equal to 1, S=L+1, when K is greater than 1, the SR is indicated with M bits so that S=L+M. Or, when K is equal to 1, S=L+1, when K is greater than 1, it is assumed that the UE needs to indicate an uplink resource request corresponding to one SR resource among the M SR resources, the number of bits of SR can be ceil(log$_2$(M+1)), thereby resulting that S=L+ ceil(log$_2$(M+1)). Or, the SR is indicated with M bits, so that S=L+M. Or, it is assumed that the UE needs to indicate an uplink resource request corresponding to one SR resource among the M SR resources, the number of bits of SR can be ceil(log$_2$(M+1)), thereby S=L+ ceil(log$_2$(M+1)). When S is less than or equal to 2 at operation 402, the base station allocates the PUCCH format carrying two bits to the UE, so that the UE transmits HARQ-ACK and SR using the PUCCH format carrying two bits. With this method, only four SPUCCH sequences are necessary for SPUCCH, which reduces the overhead of SPUCCH and ensures the transmission performance. When S is greater than 2 at operation 403, the base station allocates the PUCCH format carrying more than two bits to the UE, thereby transmitting HARQ-ACK and SR information together on the PUCCH format carrying more than two bits. Or, when S is less than or equal to 3, the base station allocates the PUCCH format carrying two bits to the UE, so that the UE transmits HARQ-ACK and SR using the PUCCH format carrying two bits, when S is greater than 3, the base station allocates the PUCCH format carrying more than two bits to the UE, thereby transmitting HARQ-ACK and SR information together on the PUCCH format carrying more than two bits. Or, when S is less than or equal to 3 and L is less than or equal to 2, the base station allocates the PUCCH format carrying two bits to the UE, so that the UE transmits HARQ-ACK and SR using the PUCCH format carrying two bits, when S is greater than 3 or L is greater than 2, the base station allocates the PUCCH format carrying more than two bits to the UE, thereby transmitting HARQ-ACK and SR information together on the PUCCH format carrying more than two bits.

Generally, within one time unit, other UCI information, such as P-CSI, can be included in addition to HARQ-ACK and/or SR that require to be fed back. In one time resource, the transmission of UCI can also be multiplexed according to the total number of bits U. The UCI includes information of the K SR resources. The information of the K SR resources can be K bits of information, or the number of SR bits which is actually necessary to be fed back by the UE can be f(K)=ceil($\log_2$(K+1)). Or, when K is equal to 1, the SR is indicated with one bit, when K is greater than 1, the SR is indicated with M bits. Or, when K is equal to 1, SR is indicated with one bit, when K is greater than 1, it is assumed that the UE needs to indicate an uplink resource request corresponding to one SR resource among the M SR resources, the number of bits of SR can be ceil($\log_2$(M+1)). Or, the SR is indicated with M bits. Or, it is assumed that the UE needs to indicate an uplink resource request corresponding to one SR resource among the M SR resources, the number of bits of the SR can be ceil($\log_2$(M+1)). When it is necessary to fed only HARQ-ACK and SR back, and U is less than or equal to 2, L is equal to 1 or 2, the base station allocates the PUCCH format carrying two bits to the UE, so that the UE transmits UCI using the PUCCH format carrying two bits, when it is necessary to feed UCI back other than HARQ-ACK and SR, or U is greater than 2, the base station allocates the PUCCH format carrying more than two bits to the UE, thereby transmitting UCI on the PUCCH format carrying more than two bits. Or, when it is necessary to feed only HARQ-ACK and SR back, and U is less than or equal to 3, L is equal to 1 or 2, the base station allocates the PUCCH format carrying two bits to the UE, so that the UE transmits UCI using the PUCCH format carrying two bits, when it is necessary to feed UCI back other than HARQ-ACK and SR, or U is greater than 3, the base station allocates the PUCCH format carrying more than two bits to the UE, thereby transmitting UCI on the PUCCH format carrying more than two bits. Or, when U is less than or equal to 2, L is equal to 1 or 2, the base station allocates the PUCCH format carrying two bits to the UE, so that the UE transmits UCI using the PUCCH format carrying two bits, when U is greater than 2, the base station allocates the PUCCH format carrying more than two bits to the UE, thereby transmitting UCI on the PUCCH format carrying more than two bits. Or, when U is less than or equal to 3, and L is equal to 1 or 2, the base station allocates the PUCCH format carrying two bits to the UE, so that the UE transmits UCI using the PUCCH format carrying two bits, when U is greater than 3, the base station allocates the PUCCH format carrying more than two bits to the UE, thereby transmitting UCI on the PUCCH format carrying more than two bits.

On one time resource, the base station can allocate the PUCCH format carrying less than or equal to two bits for the UE only when the UE needs to indicate one uplink resource request of a specified SR among the K SR resources, so that the UE transmits HARQ-ACK and the specified SR using the PUCCH format carrying less than or equal to two bits. When L is less than or equal to 2, the base station can allocate the PUCCH format carrying two bits to the UE, so that the UE transmits L bits of HARQ-ACK and SR using the PUCCH format carrying two bits. Or, the base station can allocate the PUCCH format carrying two bits to the UE only when L is equal to 1, so that the UE transmits L bits of HARQ-ACK and SR using the PUCCH format carrying two bits. The specified SR can be configured by a higher layer signaling or can be obtained according to a certain priority policy. When the UE needs to transmit uplink resource requests of other SR resources among K SR resources, only PUCCH format carrying more than two bits can be used for transmission. The other SRs can be represented by K-1 bits, correspondingly, or it can be represented by ceil($\log_2$(K-1)) assuming that the UE only needs to indicate an uplink resource request corresponding to one SR resource.

Assuming that the base station configures M SR resources to the UE, for example, configuring one physical uplink shared channel (PUSCH) resource carrying two bits of PUCCH format for each SR resource respectively. The PUCCH resource can carry only one bit of HARQ-ACK information, or the PUCCH resource can carry at most two bits of HARQ-ACK information. The number of SR resources actually configured for the UE on one time resource is K, and K is greater than or equal to 0 and K is less than or equal to M.

When K is equal to 0, or when K is greater than or equal to 1, and the UE does not need to indicate any SR, the UE only feeds UCI back other than the SR. The PUCCH resource occupied by the UE is the PUCCH resource dynamically indicated by using the ARI in the DCI.

When only HARQ-ACK is fed back, and L is less than or equal to 2, the base station allocates the PUCCH format carrying two bits to the UE using ARI, so that the UE transmits HARQ-ACK using the PUCCH format carrying two bits, when it is necessary to feed UCI back other than HARQ-ACK and SR, or L is greater than 2, the base station allocates the PUCCH format carrying more than two bits to the UE using ARI, thereby transmitting UCI on the PUCCH format carrying more than two bits. Or, the transmission of UCI can be multiplexed according to the total number of bits U. When U is less than or equal to 2, the base station allocates the PUCCH format carrying two bits to the UE using ARI, so that the UE transmits UCI using the PUCCH format carrying two bits, when U is greater than 2, the base station allocates the PUCCH format carrying more than two bits to the UE, thereby transmitting UCI on the PUCCH format carrying more than two bits.

When K is greater than or equal to 1, and the UE needs to indicate one SR among the K SRs, the SR to be indicated is SR k, and the UE feeds back the SR and other UCI information. The PUCCH resource occupied by the UE can be the PUCCH resource dynamically indicated using ARI in the DCI or the PUSCH resource carrying two bits of PUCCH format configured for SR k.

When only HARQ-ACK is fed back and L is less than or equal to 2, the UE transmits the HARQ-ACK using the PUSCH resource carrying two bits of PUCCH format configured for SR k, when it is necessary to feed UCI back other than HARQ-ACK and SR or when L is greater than 2, the base station allocates the PUCCH format carrying more than two bits by using ARI to the UE, thereby transmitting UCI on the PUCCH format carrying more than two bits. Or, the transmission of UCI can be multiplexed according to the total number of bits U of UCI excluding the SR. When V is less than or equal to 2, the UE transmits the UCI using the PUSCH resource of the PUCCH format carrying two bits configured for SR k, when V is greater than 2, the base station allocates the PUCCH format carrying more than two bits to the UE, thereby transmitting UCI on the PUCCH format carrying more than two bits. Or, the transmission of UCI can be multiplexed according to the total number of bits U. When U is less than or equal to 3 and L is less than or equal to 2, the UE transmits the UCI using the PUSCH resource carrying two bits of PUCCH format configured for SR k, when U is greater than 3, or L is greater than 2, the base station allocates the PUCCH format carrying more than two bits to the UE, thereby transmitting UCI on the PUCCH format carrying more than two bits.

Embodiment 4

In actual communication, the start OFDM symbol and/or the number of OFDM symbols of the time resources of the PUCCH configured by the base station to the UE to transmit different types of UCI information can be different. The start OFDM symbol and/or the number of OFDM symbols for PUCCH and PUSCH can also be different. With this method, when it is necessary to multiplex different uplink signals, the effects of the different start OFDM symbols and/or the number of OFDM symbols need to be taken into account.

Transmissions of some types of uplink signals are predetermined, e.g., scheduling PUSCH by UL Grant, periodic and aperiodic CSI transmission, HARQ-ACK information with a feedback delay greater than the specified threshold K1, the value K1 of which depends on the capability of the UE. When it is necessary to multiple uplink signals, the base station and the UE have sufficient processing time so that the multiplexing method can be optimized.

Other types of uplink signals, once generated, require fast transmission, e.g., urgent SR information, or HARQ-ACK information corresponding to urgent downlink transmission, resulting that the feedback delay for the UE to process HARQ-ACK is very short. Hereinafter collectively referred to as an urgent uplink signal. When an urgent uplink signal is generated, the UE may not have enough processing time to adjust the processing methods of other uplink signals already determined, or, an urgent uplink signal may be generated only after the UE has already started transmitting other uplink signals. The other uplink signals can include PUCCH and/or PUSCH. The method for processing this urgent uplink signal according to the disclosure is described below.

The first method is to define the priority of the transmission to determine the uplink signal to be transmitted. For example, the urgent uplink signal is given a higher priority, so that when the urgent uplink signal and other uplink signals cannot be multiplexed, only the urgent uplink signal is transmitted, and the other uplink signals are discarded. If the UE has already started transmitting the other uplink signals when it is necessary to transmit the urgent uplink signal, the UE transmits the latter part of the other uplink signals.

The second method is to continue transmitting the other uplink signals and transmit the urgent uplink signal by puncturing the time-frequency resources transmitting the other uplink signals. The puncturing pattern can depend on the start OFDM symbol and the number of symbols of the time-frequency resources transmitting the other uplink signals, as well as the urgent uplink signal, such as the start OFDM symbol and the number of symbols of the SR resources. The puncturing can be performed on the OFDM symbols within a range of time-frequency resources transmitting the other uplink signals. For example, the puncturing range can be from the start OFDM symbol of the urgent uplink signal, for example, starting from the start OFDM symbol of the SR resource to the end of the last OFDM symbol transmitting the time-frequency resources of the other uplink signal.

FIG. 5 is a schematic diagram of a puncturing range according to an embodiment of the disclosure.

Referring to FIG. 5, the puncturing range can be limited to overlapped OFDM symbols of the time-frequency resources for transmitting the other uplink signals and the resources for transmitting the urgent uplink signal, for example, the SR. The puncturing operation can be that transmitting the urgent uplink signal through a part of the time-frequency resources transmitting other uplink signal within the puncturing range, or transmitting the urgent uplink signal through all the time-frequency resources transmitting other uplink signal within the puncturing range.

Embodiment 5

Downlink data transmission can be Semi-persistent scheduling (SPS)-based scheduling, and accordingly PUCCH resources for HARQ-ACK feedback are also semi-statically configured. In LTE, corresponding to the SPS downlink transmission, four alternative PUCCH resources are configured by a higher signaling, and one of the four resources is dynamically indicated for transmission of HARQ-ACK information with the SPS-activated DCI. In the 5G system, assuming that the base station configures M SR resources for the UE, the periods and offsets of different SR resources can be the same or different, and M is greater than or equal to 1. Depending on the periods and offsets of the M SR resources, the number of SR resources actually configured for the UE is K on one time unit, and K is greater than or equal to 0 and is less than or equal to M. According to the SR processing method, the information of the K SR resources can be K bits of information, or the number of SR bits which is actually necessary to be fed back by the UE can be $f(K)=\text{ceil}(\log_2(K+1))$. Or, when K is equal to 1, the SR is indicated with one bit, when K is greater than 1, the SR is indicated with M bits. Or, when K is equal to 1, the SR is indicated with one bit, when K is greater than 1, it is assumed that the UE needs to indicate an uplink resource request corresponding to one SR resource among the M SR resources, the number of bits of SR can be $\text{ceil}(\log_2(M+1))$. Or, the SR is indicated with M bits. Or, it is assumed that the UE needs to indicate an uplink resource request corresponding to one SR resource among the M SR resources, the number of bits of SR can be $\text{ceil}(\log_2(M+1))$. When considering SPS transmission and K SR transmission requirements, it is necessary to consider transmitting HARQ-ACK and SR simultaneously for the PUCCH resources allocated by the SPS. Since the above K is variable and the number of bits of HARQ-ACK and SR which is necessary to be fed back varies accordingly, the base station can allocate multiple PUCCH formats accordingly to transmit HARQ-ACK and SR. In the following description, a PUCCH resource carrying one bit and a PUCCH resource carrying two bits can refer to the same PUCCH format, i.e., the PUCCH format carrying less than or equal to two bits. For example, for PUCCH format 0, one bit or two bits can be carried according to the number of allocated SPUCCH sequences. PUCCH resources carrying more than two bits must be in the PUCCH format carrying more than two bits.

In the first processing method, assuming that K is less than or equal to 1, or the UE transmits only one bit of SR information, N groups of PUCCH resources can be configured by using a higher layer signaling, each group of PUCCH resources includes one PUCCH resource carrying one bit and one PUCCH resource carrying two bits. Then, the DCI is used, for example, the DCI activated by the SPS indicates one of the N groups of PUCCH resources. On one time unit, HARQ-ACK can be transmitted by using the PUCCH resource carrying one bit when K is equal to 0, and HARQ-ACK and SR can be transmitted by using the PUCCH resource carrying two bits when K is equal to 1.

In the second processing method, assuming that K is less than or equal to 1, or the UE transmits only one bit of SR information, N PUCCH resources can be configured by using a higher-layer signaling, and each PUCCH resource is a PUCCH resource carrying two bits. Then, the DCI is used, for example, the DCI activated by the SPS indicates one of the N groups of PUCCH resources. HARQ-ACK and SR can be transmitted on one time unit by using the PUCCH resource carrying two bits.

In the third processing method, assuming that K can be greater than 1, N groups of PUCCH resources can be configured by using the higher layer signaling, each group of PUCCH resources includes one PUCCH resource carrying one bit, one PUCCH resource carrying two bits, and one PUCCH resource carrying more than two bits. Then, the DCI is used, for example, the DCI activated by the SPS indicates one of the N groups of PUCCH resources. On one time unit, HARQ-ACK can be transmitted by using the PUCCH resource carrying one bit when K is equal to 0, HARQ-ACK and SR can be transmitted by using the PUCCH resource carrying two bits when K is equal to 1, and HARQ-ACK and SR can be transmitted by using the PUCCH resource carrying more than two bits when K is greater than 1.

In the fourth processing method, assuming that K can be greater than 1, N groups of PUCCH resources can be configured by using the high layer signaling, each group of PUCCH resources includes one PUCCH resource carrying two bits and one PUCCH resource carrying more than two bits. Then, the DCI is used, for example, the DCI activated by the SPS indicates one of the N groups of PUCCH resources. On one time unit, HARQ-ACK and SR can be transmitted by using the PUCCH resource carrying two bits when K is less than or equal to 1, and HARQ-ACK and SR can be transmitted by using the PUCCH resource carrying more than two bits when K is greater than 1.

In the fifth processing method, assuming that K can be greater than 1, N groups of PUCCH resources can be configured by using the high layer signaling, each group of PUCCH resources includes one PUCCH resource carrying one bit and one PUCCH resource carrying more than two bits. Then, the DCI is used, for example, the DCI activated by the SPS indicates one of the N groups of PUCCH resources. On one time unit, HARQ-ACK can be transmitted by using the PUCCH resource carrying one bit when K is equal to 0, and HARQ-ACK and SR can be transmitted by using the PUCCH resource carrying more than two bits when K is greater than 0.

In the sixth processing method, assuming that K can be greater than 1, N groups of PUCCH resources can be configured by using the high layer signaling, each group of PUCCH resources includes one PUCCH resource carrying one bit and two PUCCH resources carrying two bits. Then, the DCI is used, for example, the DCI activated by the SPS indicates one of the N groups of PUCCH resources. On one time unit, HARQ-ACK can be transmitted by using the PUCCH resource carrying one bit when K is equal to 0, HARQ-ACK and SR can be transmitted with one PUCCH resource carrying two bits when K is equal to 1, and HARQ-ACK and SR can be transmitted by using two PUCCH resources carrying two bits when K is greater than 1.

In the seventh processing method, assuming that K can be greater than 1, N groups of PUCCH resources can be configured by using the high layer signaling, each group of PUCCH resources includes two PUCCH resources carrying two bits. Then, the DCI is used, for example, the DCI activated by the SPS indicates one of the N groups of PUCCH resources. On one time unit, HARQ-ACK and SR can be transmitted with the PUCCH resource carrying two bits when K is less than or equal to 1, and HARQ-ACK and SR can be transmitted with two PUCCH resources carrying more than two bits when K is greater than 1.

In the eighth processing method, assuming that K can be greater than 1, N groups of PUCCH resources can be configured with the higher layer signaling, each group of PUCCH resources including one PUCCH resource carrying one bit, two PUCCH resources carrying two bits, and one PUCCH resource carrying more than two bits. Then, the DCI is used, for example, the DCI activated by the SPS indicates one of the N groups of PUCCH resources. On one time unit, HARQ-ACK can be transmitted by using the PUCCH resource carrying one bit when K is equal to 0, HARQ-ACK and SR can be transmitted by using one PUCCH resource carrying two bits when K is equal to 1, HARQ-ACK and SR can be transmitted by preferentially using two PUCCH resources carrying two bits when K is greater than 1, and when the two PUCCH resources carrying two bits are not capable of transmitting HARQ-ACK and SR, HARQ-ACK and SR can be transmitted by using the PUCCH resource carrying more than two bits.

In the ninth processing method, assuming that K can be greater than 1, N groups of PUCCH resources can be configured by using the high layer signaling, each group of PUCCH resources includes two PUCCH resources carrying two bits and one PUCCH resource carrying more than two bits. Then, the DCI is used, for example, the DCI activated by the SPS indicates one of the N groups of PUCCH resources. On one time unit, HARQ-ACK and SR can be transmitted by using one PUCCH resource carrying two bits when K is less than or equal to 1, HARQ-ACK and SR can be transmitted by preferentially using two PUCCH resources carrying two bits when K is greater than 1, and when the two PUCCH resources carrying two bits are not capable of transmitting HARQ-ACK and SR, HARQ-ACK and SR can be transmitted by using the PUCCH resource carrying more than two bits.

In the tenth processing method, assuming that K can be greater than 1, and N PUCCH resources can be configured by using the high layer signaling, each PUCCH resource is one PUCCH resource carrying more than two bits. Then, the DCI is used, for example, the DCI activated by the SPS indicates one of the N groups of PUCCH resources. On one time unit, HARQ-ACK and SR are transmitted by employing the PUCCH resource carrying more than 2 bits.

Embodiment 6

In order to ensure the transmission performance of UCI, it is necessary to set the transmission power of PUCCH reasonably. In general, the transmission power of the PUCCH can be determined according to the following formula.

$$P_{PUCCH}(i) = \min\left\{ \begin{array}{l} P_{CMAX,c}(i), \\ P_{0\_PUCCH} + PL_c(k) + \Delta_{F\_PUCCH}(F) + \Delta_{PUCCH,TF,c}(i) + g(i) \end{array} \right\} [dBm]$$

Wherein, $P_{0\_PUCCH}$ is the power offset parameter, which can further include two parts, that is, $P_{0\_PUCCH}$ is the sum of the cell-specific parameter $P_{0\_NOMINAL\_PUCCH}$ and the UEspecific parameter $P_{0\_UE\_PUCCH}\cdot g(i)$ can refer to the accumulation of power control commands (TPC) to achieve closed loop power control, or $g(i)$ can be an absolute power adjustment value indicated dynamically, $\Delta_{F\_PUCCH}(F)$ is a power offset parameter related to the PUCCH format, and $\Delta_{PUCCH,TF,c}(i)$ is a parameter related to UCI type, UCI payload size, PUCCH format, coding scheme, coding gain, coding rate, or the like In the 5G system, assuming that a base station configures M SR resources to a UE, the periods and offsets of different SR resources can be the same or different, and M is greater than or equal to 1. Depending on the periods and offsets of the M SR resources, on one time unit, the number of SR resources actually configured for the UE is K, and K is greater than or equal to 0 and is less than or equal to M. The number of bits of the SR is R, and R is determined according to the above K. For example, the information of the K SR resources can be K bits of information, that is, R is equal to K, or, the number of bits R of the SR that the UE actually needs feedback can be $R=\mathrm{ceil}(\log_2(K+1))$ or $R=\log_2(K+1)$. Or, the number of bits R of the SR that the UE actually needs feedback can be $$R = \begin{cases} 0, & K = 0 \\ 1, & K > 0 \end{cases},$$

that is, distinguishing whether it is necessary to transmit at least one SR or it is unnecessary to transmit any SR. Or, when K is equal to 1, the SR is indicated with one bit, wherein R=1, when K is greater than 1, the SR is indicated with M bits, wherein R is equal to M. Or, when K is equal to 1, the SR is indicated with one bit, wherein R=1, when K is greater than 1, it is assumed that the UE needs to indicate an uplink resource request corresponding to one SR resource among the M SR resources, $R=\mathrm{ceil}(\log_2(M+1))$. Or, the SR is indicated with M bits, wherein R is equal to M. Or, it is assumed that the UE needs to indicate an uplink resource request corresponding to one SR resource among the M SR resources, $R=\mathrm{ceil}(\log_2(M+1))$.

In order to transmit UCI, UCI information can be carried by one or more SPUCCH sequences. For example, PUCCH format 0 in 5G. Specifically, one bit of HARQ-ACK is carried by using two SPUCCH sequences and two bits of HARQ-ACK are carried by using four SPUCCH sequences. For SR, only one SPUCCH sequence is allocated for one SR resource. When K SR resources are configured on one time unit, K SPUCCH sequences are configured accordingly. In addition, UCI transmission can also be based on coherent demodulation, for example PUCCH format 1 in the 5G system. For SPUCCH, when HARQ-ACK is fed back or HARQ-ACK and SR are fed back simultaneously, $2^n$ SPUCCH sequences carries n bits of $2^n$ states, when only SR is fed back, K+1 states of K SRs by using K SPUCCH sequences. Therefore, in the cases where the same number of bits is fed back, it occupies a small number of SPUCCH sequences if only SR is fed back, and thus the performance is relatively poor. Such performance differences can be compensated by transmission power control.

On one of the time units, the number of bits of HARQ-ACK is L, L is greater than or equal to 0, and a method for processing UCI transmission power is described below for the PUCCH format carrying less than or equal to two bits, for example PUCCH formats 0 and 1 in 5G. The method described below is also applicable to PUCCH formats that can carry more than two bits, such as PUCCH formats 2, 3 and 4 in 5G. A variety of HARQ-ACK and SR transmission conditions can be divided according to whether it is necessary to feed HARQ-ACK back and number of HARQ-ACK bits and whether SR resource is configured, and the number K of the configured SR resources.

For different HARQ-ACK and SR transmissions, the transmission power can be adjusted by the parameter $\Delta_{F\_PUCCH}(F)$. This is equivalent to processing different HARQ-ACK and SR transmissions as different PUCCH formats.

The first method for configuring $\Delta_{F\_PUCCH}(F)$ is to configure $\Delta_{F\_PUCCH}(F)$ separately according to whether it is necessary to feed HARQ-ACK back. For cases of not feeding HARQ-ACK back, i.e., the cases of only feeding SR back, a parameter $\Delta_{F\_PUCCH}(F)$ is configured. For cases that it is necessary to feed HARQ-ACK back, i.e., the cases of only transmitting HARQ-ACK and the cases of transmitting HARQ-ACK and SR simultaneously, another parameter $\Delta_{F\_PUCCH}(F)$ configured.

The second method for configuring $\Delta_{F\_PUCCH}(F)$ is to configure $\Delta_{F\_PUCCH}(F)$ separately according to whether the SR resource is configured. For cases that K is equal to 0, i.e., cases of only transmitting HARQ-ACK, a parameter $\Delta_{F\_PUCCH}(F)$ is configured. For cases that K is greater than 0, i.e., cases of only transmitting SR and the cases of transmitting HARQ-ACK and SR simultaneously, another parameter $\Delta_{F\_PUCCH}(F)$ is configured.

The third method for configuring $\Delta_{F\_PUCCH}(F)$ is to configure a first parameter $\Delta_{F\_PUCCH}(F)$ for cases that K is equal to 0, i.e., only transmitting HARQ-ACK, for cases that K is greater than 0 and it is unnecessary to feed HARQ-ACK back, i.e., only feeding SR back, a second parameter $\Delta_{F\_PUCCH}(F)$ is configured, for cases that K is greater than 0 and it is necessary to feed HARQ-ACK back, i.e., cases of transmitting HARQ-ACK and SR simultaneously, a third parameter $\Delta_{F\_PUCCH}(F)$ is configured.

Or, for cases that K is equal to 0, i.e., cases of only transmitting HARQ-ACK, a first parameter $\Delta_{F\_PUCCH}(F)$ is configured, for cases that K is greater than 0 and it is unnecessary to feed HARQ-ACK back, i.e., only feeding SR back, a second parameter $\Delta_{F\_PUCCH}(F)$ is configured, for cases that K is greater than 0 and it is necessary to feed HARQ-ACK back, i.e., cases of transmitting HARQ-ACK and SR simultaneously, the maximum value between the first parameter $\Delta_{F\_PUCCH}(F)$ and the second parameter $\Delta_{F\_PUCCH}(F)$ are used as the parameter $\Delta_{F\_PUCCH}(F)$.

The fourth method for configuring $\Delta_{F\_PUCCH}(F)$ is to divide the number of bits of UCI into three cases, and set $\Delta_{F\_PUCCH}(F)$ for the above three cases respectively.

1) one bit, for example, can be one bit of HARQ-ACK, or one bit of SR information, 2) two bits, for example, can be two bits of HARQ-ACK, or, one bit of HARQ-ACK and one bit of SR, or, can be two bits of SR information;

3) three bits, for example, can be one bit of HARQ-ACK and two bits of SR, or, can be two bits of HARQ-ACK and one bit of SR, or, can be three bits of SR information.

By employing this method, the above three cases are treated as different PUCCH formats. The different transmission power requirements of the above three cases can be met by setting $\Delta_{F\_PUCCH}(F)$ separately.

The fifth method for configuring $\Delta_{F\_PUCCH}(F)$ is to distinguish whether the SR resource is configured and configure $\Delta_{F\_PUCCH}(F)$ respectively for different number of bits L of the HARQ-ACK.

By employing the above method for configuring $\Delta_{F\_PUCCH}(F)$ $\Delta_{F\_PUCCH}(F)$ can be configured for different PUCCH formats, such as PUCCH format 0 and PUCCH format 1 respectively. In fact, even for the same PUCCH format, depending on the number of OFDM symbols and whether the frequency hopping is employed, it can be divided into multiple sub-formats, and $\Delta_{F\_PUCCH}(F)$ can be configured for each sub-format by employing the method for configuring $\Delta_{F\_PUCCH}(F)$ respectively. For example, PUCCH format 0 can be divided into three sub-formats, i.e., a sub-format that occupies only one OFDM symbol, a sub-format that occupies two OFDM symbols and does not employ frequency hopping, and a sub-format that occupies two OFDM symbols and employs frequency hopping, and thus $\Delta_{F\_PUCCH}(F)$ can be configured for each sub-format by employing the method for configuring $\Delta_{F\_PUCCH}(F)$, respectively. Or, PUCCH format 0 can be divided into two sub-formats according to whether frequency hopping is supported or not, and $\Delta_{F\_PUCCH}(F)$ can be configured for each sub-format by employing the method for configuring $\Delta_{F\_PUCCH}(F)$ respectively. For PUCCH format 1, it is possible to be divided into multiple sub-formats according to whether frequency hopping is supported and/or OFDM symbol number, and $\Delta_{F\_PUCCH}(F)$ can be configured for each sub-format by employing the method for configuring $\Delta_{F\_PUCCH}(F)$ respectively.

For different HARQ-ACK and SR transmissions, the transmission power can also be adjusted by the parameter $\Delta_{PUCCH,TF,c}(i)$. In the case where the number of bits is the same, according to the above analysis, the performance of transmitting only the SR and the performance of transmitting at least the HARQ-ACK are different, therefore, for the cases of transmitting only the SR and the cases of transmitting at least the HARQ-ACK, $\Delta_{PUCCH,TF,c}(i)$ can be different.

The first method for configuring $\Delta_{PUCCH,TF,c}(i)$ is to determine $\Delta_{PUCCH,TF,c}(i)$ based on the number of bits L of HARQ-ACK and the number of bits R of SR, that is, $\Delta_{PUCCH,TF,c}(i)=f(L, R, i)$. The disclosure does not limit the specific form of $f(L, R, i)$ and whether $\Delta_{PUCCH,TF,c}(i)$ is also related to other parameters.

For example, $\Delta_{PUCCH,TF,c}(i)$ can be determined according to the total number of bits of HARQ-ACK and SR, i.e., L+R·$\Delta_{PUCCH,TF,c}(i)=f\cdot(L+R,i)$, and the disclosure does not limit specific form of $f\cdot(L+R, i)$.

Or, for cases of feeding SR back only, $\Delta_{PUCCH,TF,c}(i)$ can be a fixed value which is independent of the number of SR resources, or, $\Delta_{PUCCH,TF,c}(i)$ can be determined according to the number of bits R. For cases of at least feeding HARQ-ACK back, $\Delta_{PUCCH,TF,c}(i)$ can be determined according to the number of bits L of HARQ-ACK. For example, this method can be used in conjunction with the first method for configuring $\Delta_{F\_PUCCH}(F)$. The functions for determining $\Delta_{PUCCH,TF,c}(i)$ according to R and for determining $\Delta_{PUCCH,TF,c}(i)$ according to L can be the same or different.

Or, for the case of feeding SR back only, $\Delta_{PUCCH,TF,c}(i)$ can be a fixed value which is independent of the number of SR resources, or, $\Delta_{PUCCH,TF,c}(i)$ can be determined according to the number of bits R. For the case of at least feeding HARQ-ACK back, $\Delta_{PUCCH,TF,c}(i)$ can be determined according to the total number of bits of HARQ-ACK and SR, i.e., L+R, $\Delta_{PUCCH,TF,c}(i)=f\cdot(L+R, i)$, the disclosure is not limited to the specific form of $f\cdot(L+R, i)$. For example, this method can be used in conjunction with the first method for configuring $\Delta_{F\_PUCCH}(F)$. The functions for determining $\Delta_{PUCCH,TF,c}(i)$ according to R and for determining $\Delta_{PUCCH,TF,c}(i)$ according to L+R can be the same or different.

Or, for cases of feeding only HARQ-ACK back, $\Delta_{PUCCH,TF,c}(i)$ can be determined according to the number of bits L of HARQ-ACK. For cases of at least feeding of SR back, $\Delta_{PUCCH,TF,c}(i)$ can be determined according to the total number of bits of HARQ-ACK and SR, i.e., L+R, $\Delta_{PUCCH,TF,c}(i)=f\cdot(L+R, i)$, the disclosure is not limited to the specific form of $f\cdot(L+R, i)$. For example, this method can be used in conjunction with the second method for configuring $\Delta_{F\_PUCCH}(F)$ The functions for determining $\Delta_{PUCCH,TF,c}(i)$ according to L and for determining $\Delta_{PUCCH,TF,c}(i)$ according to L+R can be the same or different.

Or, for cases of feeding SR back only, $\Delta_{PUCCH,TF,c}(i)$ can be a fixed value which is independent of the number of SR resources, or, $\Delta_{PUCCH,TF,c}(i)$ can be determined according to the number of bits R. By employing this method, the transmission power can be adjusted according to the number of bits of the SR. For cases of feeding HARQ-ACK back only, $\Delta_{PUCCH,TF,c}(i)$ can be determined according to the number of bits L of HARQ-ACK. By employing this method, the transmission power can be adjusted according to L. For cases of feeding SR and HARQ-ACK back simultaneously, $\Delta_{PUCCH,TF,c}(i)$ can be determined according to the total number of bits of HARQ-ACK and SR, i.e., L+R, $\Delta_{PUCCH,TF,c}(i)=f\cdot(L+R, i)$, the disclosure is not limited to the specific form of $f\cdot(L+R, i)$. The functions for determining $\Delta_{PUCCH,TF,c}(i)$ according to R, for determining $\Delta_{PUCCH,TF,c}(i)$ according to L, and for determining $\Delta_{PUCCH,TF,c}(i)$ according to L+R can be the same or different.

The second method for configuring $\Delta_{PUCCH,TF,c}(i)$ is to determine $\Delta_{PUCCH,TF,c}(i)$ according to the number of bits L of HARQ-ACK and the number K of SR resources, that is, $\Delta_{PUCCH,TF,c}(i)=f(L, K, i)$. The disclosure does not limit the specific form of $f(L, K, i)$ and whether $\Delta_{PUCCH,TF,c}(i)$ is also related to other parameters.

For example, for cases of feeding only SR back, $\Delta_{PUCCH,TF,c}(i)$ can be a fixed value which is independent of the number of SR resources, or, $\Delta_{PUCCH,TF,c}(i)$ can be determined according to the number K of SR resources. For cases of at least feeding HARQ-ACK back, $\Delta_{PUCCH,TF,c}(i)$ can be determined according to the number of bits L of HARQ-ACK. For example, this method can be used in conjunction with the first method for configuring $\Delta_{F\_PUCCH}(F)$. The functions for determining $\Delta_{PUCCH,TF,c}(i)$ according to K and for determining $\Delta_{PUCCH,TF,c}(i)$ according to L can be the same or different.

Or, for cases of feeding only SR back, $\Delta_{PUCCH,TF,c}(i)$ can be a fixed value, which is independent of the number of SR resources, or, $\Delta_{PUCCH,TF,c}(i)$ can be determined according to the number K of SR resources. For cases of at least feeding HARQ-ACK back, $\Delta_{PUCCH,TF,c}(i)$ can be determined according to L and K. For example, this method can be used in conjunction with the first method for configuring $\Delta_{F\_PUCCH}(F)$. The functions for determining $\Delta_{PUCCH,TF,c}(i)$ according to K and for determining $\Delta_{PUCCH,TF,c}(i)$ according to L and K can be the same or different.

Or, for cases of feeding only HARQ-ACK back, $\Delta_{PUCCH,TF,c}(i)$ can be determined according to the number of bits L of HARQ-ACK. For cases of feeding only SR back, $\Delta_{PUCCH,TF,c}(i)$ can be determined according to L and K. For example, this method can be used in conjunction with the second method for configuring $\Delta_{F\_PUCCH}(F)$. The functions for determining $\Delta_{PUCCH,TF,c}(i)$ according to L and for determining $\Delta_{PUCCH,TF,c}(i)$ according to L and K can be the same or different.

Or, for cases of feeding only SR back, $\Delta_{PUCCH,TF,c}(i)$ can be a fixed value, independent of the number of SR resources, or, $\Delta_{PUCCH,TF,c}(i)$ can be determined according to the number K of SR resources. By employing this method, the transmission power can be adjusted according to K. For cases of feeding HARQ-ACK back only, $\Delta_{PUCCH,TF,c}(i)$ can be determined according to the number of bits L of HARQ-ACK. By employing this method, the transmission power can be adjusted according to L. For cases of feeding SR and HARQ-ACK back simultaneously, $\Delta_{PUCCH,TF,c}(i)$ can be determined according to L and K. The functions for determining $\Delta_{PUCCH,TF,c}(i)$ according to K, for determining $\Delta_{PUCCH,TF,c}(i)$ according to L, and for determining $\Delta_{PUCCH,TF,c}(i)$ according to L and K can be the same or different.

By employing the method for configuring $\Delta_{PUCCH,TF,c}(i)$, $\Delta_{PUCCH,TF,c}(i)$ can be configured for different PUCCH formats, such as PUCCH format 0 and PUCCH format 1 respectively. In fact, even for the same PUCCH format, according to the number of OFDM symbols and whether or not frequency hopping is employed, it can still be divided into multiple sub-formats, and $\Delta_{PUCCH,TF,c}(i)$ can be configured for each sub-format by employing the method for configuring $\Delta_{PUCCH,TF,c}(i)$ respectively. For example, PUCCH format 0 can be divided into three sub-formats, i.e., a sub-format that occupies only one OFDM symbol, a sub-format that occupies two OFDM symbols and does not employ frequency hopping, and a sub-format that occupies two OFDM symbols and employs frequency hopping, and thus $\Delta_{PUCCH,TF,c}(i)$ can be configured for each sub-format by employing the method for configuring $\Delta_{PUCCH,TF,c}(i)$, respectively. Or, PUCCH format 0 can be divided into two sub-formats according to whether frequency hopping is supported, and $\Delta_{PUCCH,TF,c}(i)$ can be configured for each sub-format by employing the method for configuring $\Delta_{PUCCH,TF,c}(i)$. For PUCCH format 1, it is possible to be divided into multiple sub-formats according to whether frequency hopping is supported and/or OFDM symbol number, and $\Delta_{PUCCH,TF,c}(i)$ can be configured for each sub-format by employing the method for configuring $\Delta_{PUCCH,TF,c}(i)$ respectively.

By employing the method for configuring $\Delta_{F\_PUCCH}(F)$, $\Delta_{PUCCH,TF,c}(i)$ can be a fixed value, such as 0 dB. By employing the method for configuring $\Delta_{PUCCH,TF,c}(i)$, $\Delta_{F\_PUCCH}(F)$ can be a fixed value, for example, a $\Delta_{F\_PUCCH}(F)$ is configured for a PUCCH format that supports less than or equal to 2 bits, such as PUCCH format 0 or PUCCH format 1, which is independent of the specific UCI information carried. Or, $\Delta_{F\_PUCCH}(F)$ can be configured by employing the method for configuring $\Delta_{F\_PUCCH}(F)$, meanwhile, $\Delta_{PUCCH,TF,c}(i)$ can be configured by employing the method for configuring $\Delta_{PUCCH,TF,c}(i)$.

Embodiment 7

Figure 6:
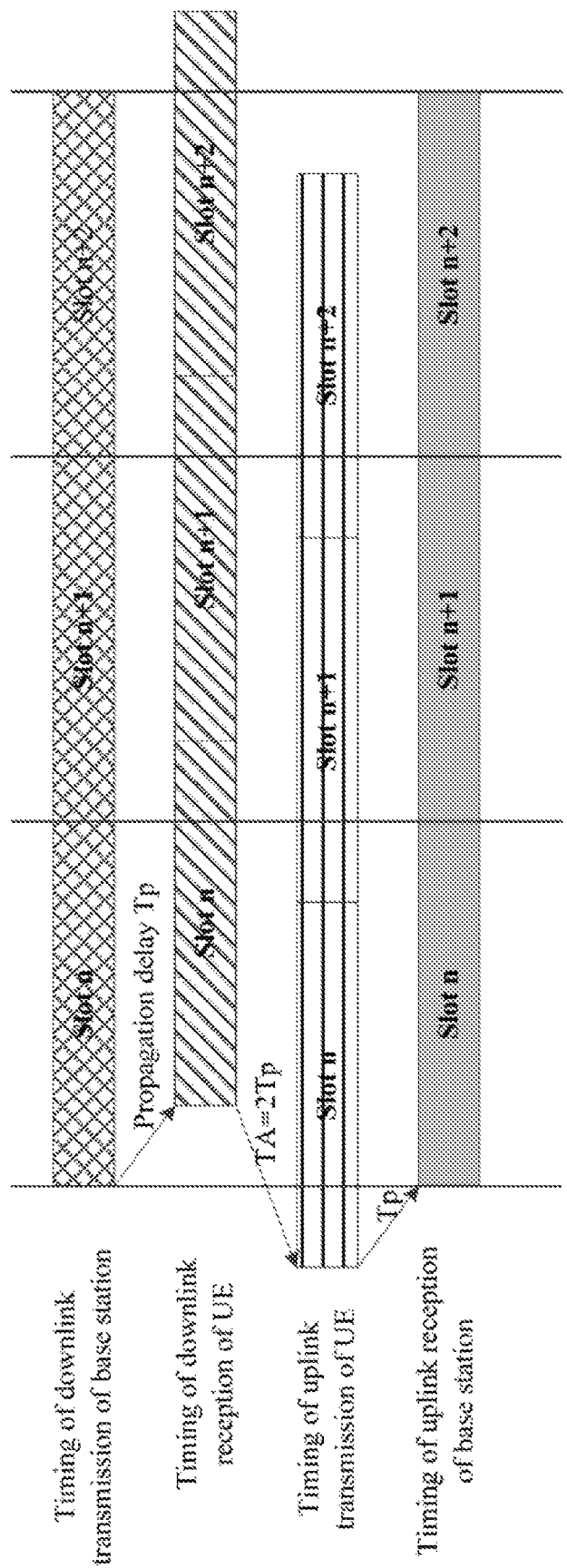
FIG. 6 is a schematic diagram of alignment of an uplink slot and a downlink slot on a base station side according to an embodiment of the disclosure.

FIG. 6 is a schematic diagram of alignment of an uplink slot and a downlink slot on a base station side according to an embodiment of the disclosure.

For an FDD system, one operating mode is such that the downlink slot and uplink slot on the base station side are aligned or substantially aligned. The substantial alignment represents a small timing deviation of the uplink slot and the downlink slot on the base station side, for example less than a length of one OFDM symbol.

Referring to FIG. 6, assuming that the propagation delay is Tp, the time advance (TA) value configured by the base station to the UE is about 2Tp, so that the uplink slot and the downlink slot are aligned in boundary when the uplink signal of the UE arrives at the base station.

For the FDD system, another possible operating mode is such that the downlink slot and the uplink slot on the base station side have a timing deviation. For example, the timing deviation can be greater than or equal to one OFDM symbol. The method for generating the timing deviation according to the disclosure will be described below. In general, for one UE, the base station can generate the timing deviation by configuring an appropriate TA.

The first method is that the TA value $N_{TA}$ actually configured by the base station is greater than the TA $N_{TA,prop}$ necessary for aligning the uplink slot and the downlink slot. $N_{TA}$ can be expressed as $N_{TA}=N_{TA,prop}+N_{TA,offset}$. Wherein the TA necessary for aligning the uplink slot and the downlink slot alignment is $N_{TA,prop}$, and the additional TA configured by the base station is $N_{TA,offset}$, thereby generating additional TA, $N_{TA,offset}$ is greater than 0, for example, the time period corresponding to $N_{TA,offset}$ is greater than or equal to one OFDM symbol.

Figure 7:
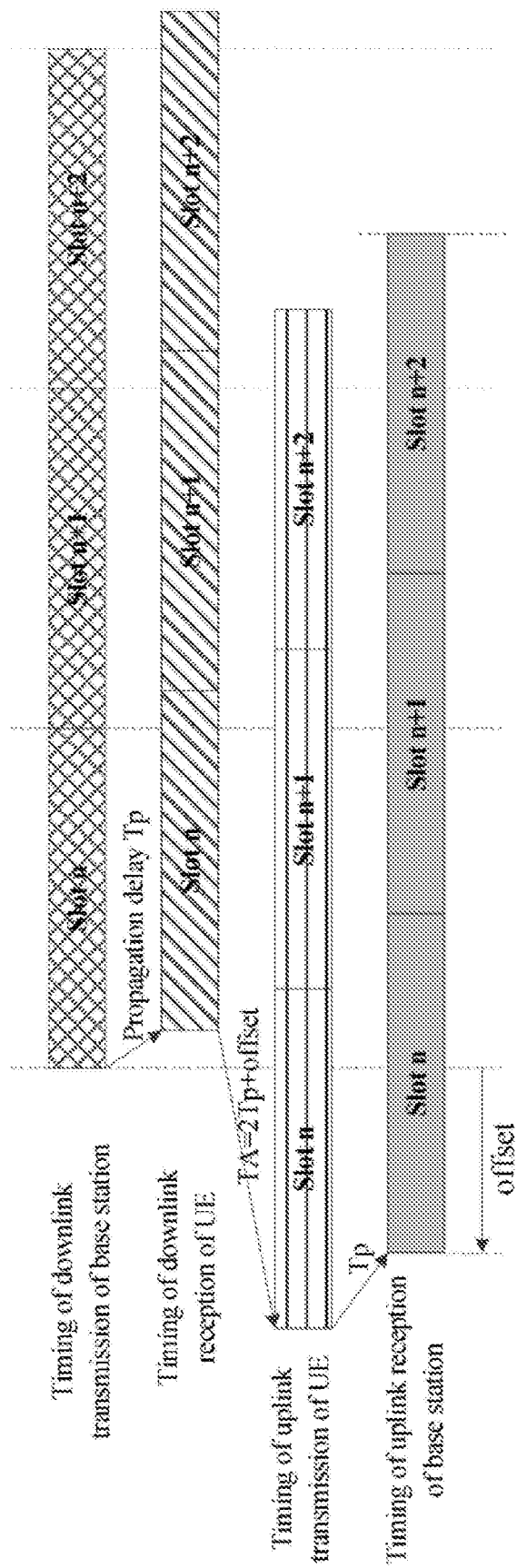
FIG. 7 is a schematic diagram I of timing deviation of an uplink slot and a downlink slot generated by a time advance (TA) according to an embodiment of the disclosure.

FIG. 7 is a schematic diagram I of timing deviation of an uplink slot and a downlink slot generated by a TA according to an embodiment of the disclosure.

Referring to FIG. 7, assuming that the propagation delay is Tp and the timing deviation of the required uplink slot and downlink slot is offset, the TA value configured by the base station to the UE is about 2Tp+offset, so that when the uplink signal of the UE arrives at the base station, the uplink slot boundary is offset ahead of the downlink slot boundary. By employing this method, the value range of TA to be supported is greater than the case of uplink and downlink subframe alignment on the base station side.

The second method is that, for a part of the UEs, the TA $N_{TA}^+$ actually configured by the base station is greater than the TA $N_{TA,prop}^+$ necessary to align the uplink slot and the downlink slot. $N_{TA}^+$ can be expressed as $N_{TA}^+=N_{TA,prop}^++N_{TA,offset}^+$. For example, the part of the UEs can be the UEs located adjacent to the center of a cell. Wherein, the additional TA configured by the base station is $N_{TA,offset}^+$, so as to generate the additional TA, wherein $N_{TA,offset}^+$ is greater than 0, for example, the time period corresponding to $N_{TA,offset}^+$ is greater than or equal to one OFDM symbol. For other UEs, the TA value $N_{TA}^-$ actually configured by the base station is less than the TA $N_{TA,prop}^-$ necessary to align the uplink slot and the downlink slot, and $N_{TA}^-$ can be expressed as $N_{TA}^-=N_{TA,prop}^--N_{TA,offset}^-$. For example, the other UEs can be UEs located near cell boundaries. Wherein, the TA that the base station decreases is $N_{TA,offset}^-$, so as to generate a time lag, and $N_{TA,offset}^-$ is greater than 0, for example, the time period corresponding to $N_{TA,offset}^-$ is greater than or equal to one OFDM symbol. In fact, in order to facilitate uplink multi-user multiplexing, the uplink slot boundaries of the part of the UEs and the uplink slot boundaries of the other UEs should be aligned or substantially aligned. Thus, the sum of $N_{TA,offset}^+$ and $N_{TA,offset}^-$ should be equal to or approximately equal to an integer multiple of the slot length.

Figure 8:
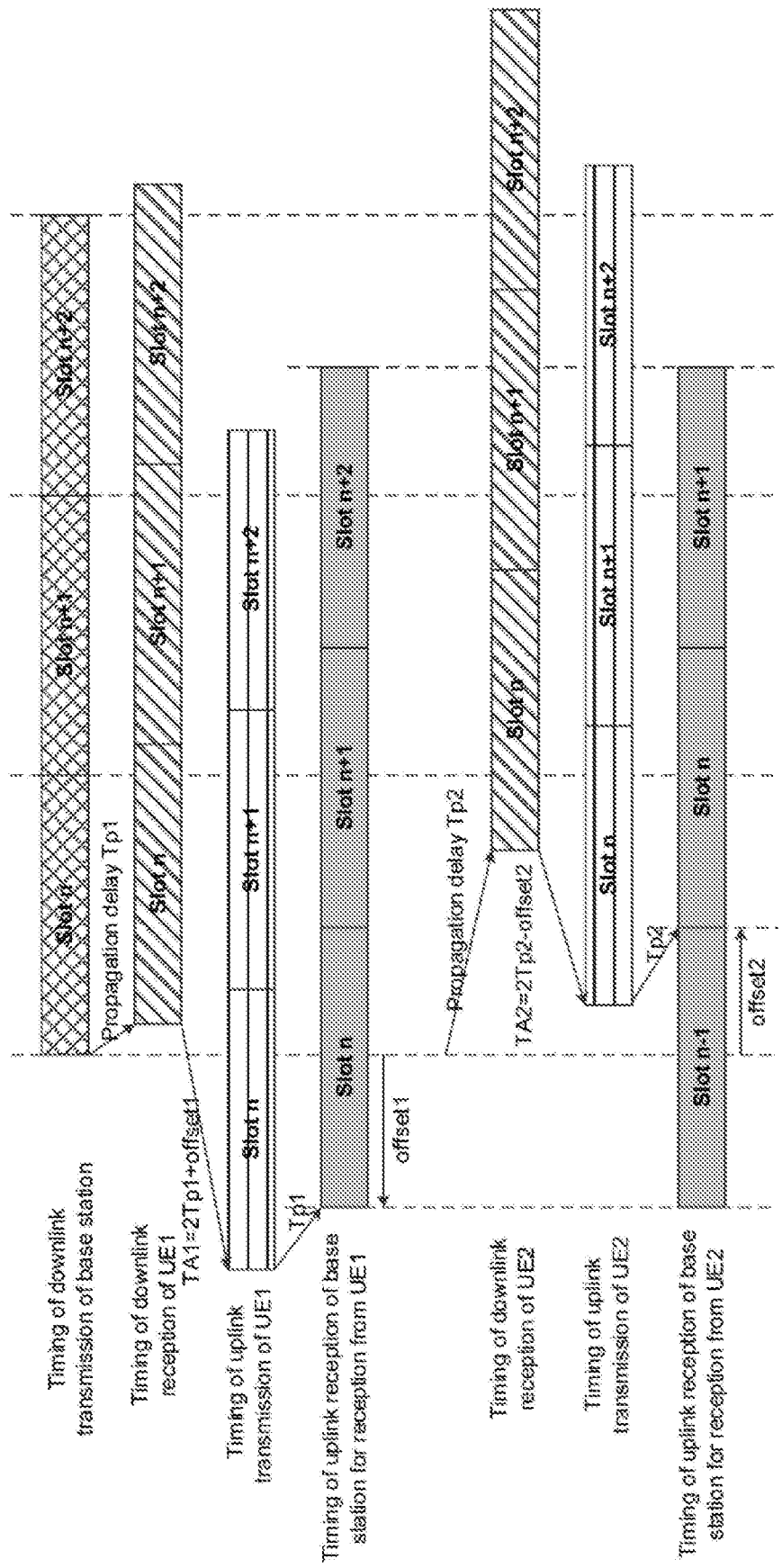
FIG. 8 is a schematic diagram II of timing deviation of an uplink slot and a downlink slot generated by a TA according to an embodiment of the disclosure.

FIG. 8 is a schematic diagram II of timing deviation of an uplink slot and a downlink slot generated by a TA according to an embodiment of the disclosure.

Referring to FIG. 8, for UE1, assuming that the propagation delay is Tp1 and the additional TA configured is offset1, the TA value configured by the base station to the UE is about 2Tp1+offset1, so that when the uplink signal of the UE arrives at the base station, the uplink slot boundary is advanced by offset1 than the downlink slot boundary. For UE 2, assuming that the propagation delay is Tp2 and the decreased TA is offset2, the TA value configured by the base station to the UE is about 2Tp2−offset2, so that when the uplink signal of the UE arrives at the base station, the uplink slot boundary lags by offset2 than the downlink slot boundary. Wherein, the sum of offset1 and offset2 corresponds to the length of one slot such that the uplink slot boundaries of UE1 and UE2 are aligned. However, for one uplink slot, the serial numbers of uplink slots considered by UE1 and UE2 are different. When the uplink resources actually configured by UE1 and UE2 are time division multiplexed or frequency division multiplexed, the two UEs do not influence each other. When it is necessary to for the UE1 and UE2 to occupy the same time-frequency resource, it is necessary to consider different influences of serial numbers of the uplink slots. For example, the uplink transmission of the UE is caused to be independent of the serial number of the slot, or, the base station configures the offset of the serial number of the uplink slot of the UE so that the serial number of the uplink slot of all the UEs are consistent. The disclosure does not limit the method of processing the serial number of the uplink slot. In FIG. 8, UE1 considers one slot as slot n+1 and UE2 considers the slot as slot n. By employing this method, the value range of the supported TA is [0, Nmax]. Therefore, as long as Nmax is greater than or equal to the length of one slot, the base station can flexibly control the offset of the uplink slot boundary and the downlink slot boundary. In particular, Nmax is equal to the length of one slot, thereby reducing the signaling overhead indicating TA and avoiding unnecessary TA values.

Figure 9:
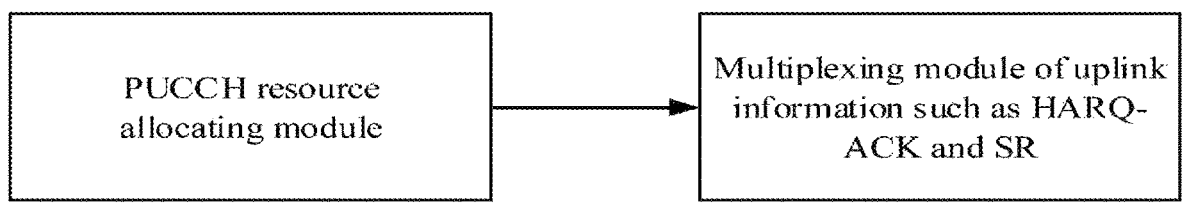
FIG. 9 is an equipment diagram according to an embodiment of the disclosure.

FIG. 9 is an equipment diagram according to an embodiment of the disclosure.

Referring to FIG. 9, the application also discloses an equipment which can be used for implementing the method, and the equipment includes a PUCCH resource allocating module and an uplink signal multiplexing module.

The PUCCH resource allocating module, configured for determining and configuring a PUCCH resource for transmitting UCI information such as HARQ-ACK and/or SR, or the like.

The uplink signal multiplexing module, configured for transmitting uplink information, such as HARQ-ACK and SR and the like in a multiplexing way, and generating the PUCCH signal to be fed back according to the number of SR resources configured on one time resource and whether it is necessary to transmit the SR.

Those skilled in the art will appreciate that all or part of the operations carried by implementing the method of the various embodiments may be performed by means of a program that may be stored in a computer-readable storage medium, when the program is executed, one of the operations of the method embodiment or a combination thereof is included.

In addition, each functional unit in various embodiments of the present application may be integrated in one processing module, may be a separate physical presence of each unit, or may be integrated in one module with two or more units. The integrated modules can be either implemented in the form of hardware or in the form of software functional module. When the integrated module is implemented in the form of a software functional module and is sold or used as an independent product, the integrated module may also be stored in a computer-readable storage medium.

The storage medium may be a read-only memory (ROM), a magnetic disk, an optical disk, or the like.

The foregoing is merely a preferred embodiment of the present application and is not intended to limit the present application, and any modifications, equivalent substitutions, improvements, or the like, that may be made within the spirit and principles of the present application are intended to be included within the scope of the present application.

Figure 10:
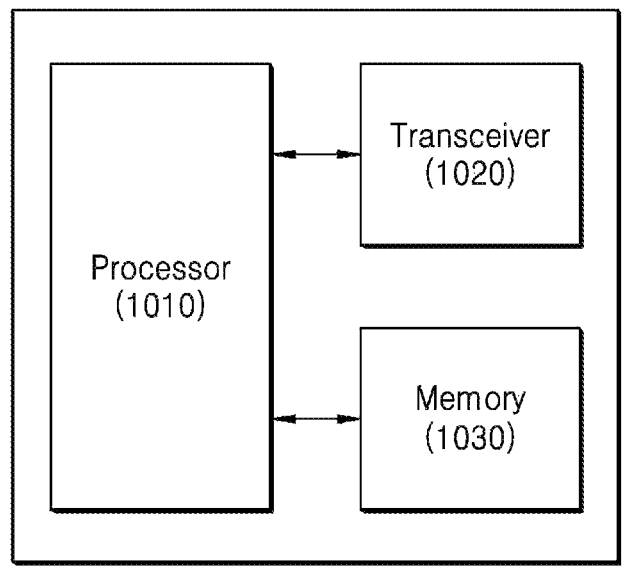
FIG. 10 is a block diagram illustrating a user equipment (UE) according to an embodiment of the disclosure.

FIG. 10 is a block diagram illustrating a UE according to an embodiment of the disclosure.

Referring to FIG. 10, a device 1000 may include a processor 1010, a transceiver 1020, and a memory 1030. However, all of the illustrated components are not essential. The device 1000 may be implemented by more or less components than those illustrated in FIG. 10. In addition, the processor 1010 and the transceiver 1020 and the memory 1030 may be implemented as a single chip according to another embodiment.

The aforementioned components will be described below.

The processor 1010 may include one or more processors or other processing devices that control the proposed function, process, and/or method. The processor may include a context matching controller, coupled to the memory 1030. Operation of the device 1000 may be implemented by the processor 1010.

The processor 1010 may include a PUCCH resource allocating module, configured for determining a PUCCH resource for transmitting HARQ-ACK and/or SR, and an uplink signal multiplexing module, configured for determining the occupied PUCCH resource and transmitting HARQ-ACK and SR according to the SR resource configured on one time resource and whether it is necessary to transmit the SR currently.

The transceiver 1020 may include a RF transmitter for up-converting and amplifying a transmitted signal, and a RF receiver for down-converting a frequency of a received signal. However, according to an embodiment of the disclosure, the transceiver 1020 may be implemented by more or less components than those illustrated in components.

The transceiver 1020 may be connected to the processor 1010 and transmit and/or receive a signal. The signal may include control information and data. In addition, the transceiver 1020 may receive the signal through a wireless or wired channel and output the signal to the processor 1010. The transceiver 1020 may transmit a signal output from the processor 1010 through the wireless channel. The transceiver 1020 may communicate with other entities through a wired channel.

The memory 1030 may store the control information or the data included in a signal obtained by the device 1000. The memory 1030 may be connected to the processor 1010 and store at least one instruction or a protocol or a parameter for the proposed function, process, and/or method. The memory 1030 may include ROM and/or random access memory (RAM) and/or hard disk and/or compact (CD)-ROM and/or digital versatile disc (DVD) and/or other storage devices.

Figure 11:
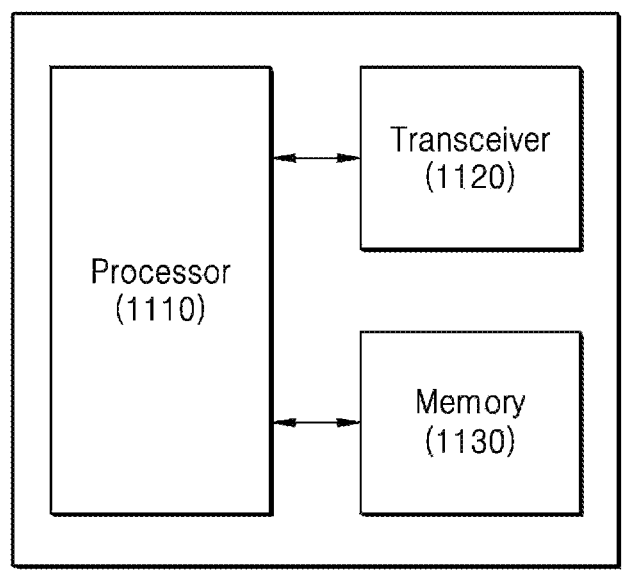
FIG. 11 is a block diagram illustrating a base station according to an embodiment of the disclosure.

FIG. 11 is a block diagram illustrating a base station according to an embodiment of the disclosure.

Referring to FIG. 11, the device 1100 may include a processor 1110, a transceiver 1120 and a memory 1130. However, all of the illustrated components are not essential. The device 1100 may be implemented by more or less components than those illustrated in FIG. 11. In addition, the processor 1110 and the transceiver 1120 and the memory 1130 may be implemented as a single chip according to another embodiment.

The aforementioned components will now be described below.

The processor 1110 may include one or more processors or other processing devices that control the proposed function, process, and/or method. The processor 1110 may include a context matching controller coupled to the memory 1130. Operation of the device 1100 may be implemented by the processor 1110.

The transceiver 1120 may include a RF transmitter for up-converting and amplifying a transmitted signal, and a RF receiver for down-converting a frequency of a received signal. However, according to an embodiment of the disclosure, the transceiver 1120 may be implemented by more or less components than those illustrated in components.

The transceiver 1120 may be connected to the processor 1110 and transmit and/or receive a signal. The signal may include control information and data. In addition, the transceiver 1120 may receive the signal through a wireless channel and output the signal to the processor 1110. The transceiver 1120 may transmit a signal output from the processor 1110 through the wireless channel.

The memory 1130 may store the control information or the data included in a signal obtained by the device 1100. The memory 1130 may be connected to the processor 1110 and store at least one instruction or a protocol or a parameter for the proposed function, process, and/or method. The memory 1130 may include ROM and/or RAM and/or hard disk and/or CD-ROM and/or DVD and/or other storage devices.

Those skilled in the art may understand achieving all or a portion of the operations carried out by the method embodiments described above may be accomplished through commanding the associated hardware by a program, the program may be stored in a computer readable storage medium, when it is executed, one of the operations of the method embodiments or a combination thereof is included.

In addition, the functional units in the various embodiments of the present application may be integrated in a processing module, or each unit may be physically present individually, or two or more units may be integrated in one module. The integrated module may be implemented in the form of hardware, and may also be achieved in the form of software function modules. The integrated module may also be stored in a computer-readable storage medium if it is implemented in the form of a software function module and is sold or used as a standalone product.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment, UE, in a wireless communication system, the method comprising:
receiving, from a base station, through high layer signaling, configuration information including information associated with a plurality of physical uplink control channel (PUCCH) resources, wherein a set of initial cyclic offsets is indicated by the information associated with the plurality of PUCCH resources; and
transmitting, to the base station, uplink control information (UCI) including hybrid automatic repeat request-acknowledgement (HARQ-ACK) via a PUCCH based on the set of initial cyclic offsets,
wherein in case that the plurality of PUCCH resources are not dedicated for the UE, the set of initial cyclic offsets includes 0, 4, and 8,
based on one information bit used for the HARQ-ACK, value of the one information bit is indicated based on one of sequence cyclic offsets including 0 and 6, and
cyclic offset for the UE is determined based on one of the set of initial cyclic offsets and the one of the sequence cyclic offsets.

2. The method of claim 1, wherein format of the plurality of PUCCH resources is PUCCH format 0.

3. The method of claim 1, further comprising:
receiving, from the base station, through high layer signaling, another configuration information including a plurality of resources, each of the plurality of resources corresponding to each of a plurality of scheduling requests (SRs) respectively, K SRs among the plurality of SRs being configured to be transmitted by the UE in a slot via K PUCCHs, respectively, K being an integer greater than 1;
generating another UCI including information of another HARQ-ACK and information of an SR among the K SRs; and
transmitting, to the base station, the other UCI via another PUCCH,
wherein a number of information bits of the information of SR in the other UCI is $\lceil \log_2(K+1) \rceil$, and
wherein each of K different codewords derived from the $\lceil \log_2(K+1) \rceil$ information bits indicates each of the K SRs respectively.

4. The method of claim 3, wherein one codeword of the $\lceil \log_2(K+1) \rceil$ bits indicates no SRs for all the K SRs.

5. The method of claim 3, wherein format of the other PUCCH is one of PUCCH format 2, PUCCH format 3, and PUCCH format 4.

6. The method of claim 3, wherein the other UCI further includes information of channel state information (CSI) report.

7. The method of claim 3, wherein:
the other configuration information further includes periodicity and offset information for at least one resource, and
resources for the K SRs are configured by the periodicity and offset information.

8. The method of claim 3,
wherein the other HARQ-ACK comprises L bit HARQ-ACK; and
wherein the transmitting the other UCI comprises transmitting L bit HARQ-ACK via the other PUCCH using PUCCH format 2 or PUCCH format 3 or PUCCH format 4.

9. The method of claim 3, wherein transmission occasion of the SR overlaps with transmission of the other PUCCH with the other HARQ-ACK information in a slot.

10. A method performed by a base station in a wireless communication system, the method comprising:
transmitting, to a user equipment (UE), through high layer signaling, configuration information including information associated with a plurality of physical uplink control channel (PUCCH) resources, wherein a set of initial cyclic offsets is indicated by the information associated with the plurality of PUCCH resources; and
receiving from the UE, uplink control information (UCI) including hybrid automatic repeat request-acknowledgement (HARQ-ACK) via a PUCCH based on the set of initial cyclic offsets,
wherein in case that the plurality of PUCCH resources are not dedicated for the UE, the set of initial cyclic offsets includes 0, 4, and 8,
based on one information bit used for the HARQ-ACK, value of the one information bit is indicated based on one of sequence cyclic offsets including 0 and 6, and
cyclic offset for the UE is determined based on one of the set of initial cyclic offsets and the one of the sequence cyclic offsets.

11. The method of claim 10, wherein format of the plurality of PUCCH resources is PUCCH format 0.

12. The method of claim 10, further comprising:
transmitting, to the UE, through high layer signaling, another configuration information including a plurality of resources, each of the plurality of resources corresponding to each of a plurality of scheduling requests (SRs) respectively, K SRs among the plurality of SRs being configured to be transmitted by the UE in a slot via K PUCCHs, respectively, K being an integer greater than 1; and
receiving, from the UE, another UCI via another PUCCH,
wherein the other UCI includes information of another HARQ-ACK and information of an SR among the K SRs,
wherein a number of information bits of the information of SR in the other UCI is $\lceil \log_2 (K+1) \rceil$, and
wherein each of K different codewords derived from the $\lceil \log_2(K+1) \rceil$ information bits indicates each of the K SRs respectively.

13. The method of claim 10, wherein the other UCI further includes information of channel state information (CSI) report.

14. The method of claim 10, wherein:
the other configuration information further includes periodicity and offset information for at least one resource, and
resources for the K SRs are configured by the periodicity and offset information.

15. The method of claim 10,
wherein the other HARQ-ACK comprises L bit HARQ-ACK; and
wherein the receiving the other UCI comprises receiving L bit HARQ-ACK via the other PUCCH of PUCCH format 2 or PUCCH format 3 or PUCCH format 4.

16. The method of claim 10, wherein transmission occasion of the SR overlaps with transmission of the other PUCCH with the other HARQ-ACK information in a slot.

17. A user equipment (UE) in a wireless communication system, the UE comprising:
a transceiver; and
at least one processor operably connected with the transceiver, the at least one processor configured to:
receive, from a base station, by controlling the transceiver, through high layer signaling, configuration information including information associated with a plurality of physical uplink control channel (PUCCH) resources, wherein a set of initial cyclic offsets is indicated by the information associated with the plurality of PUCCH resources, and
transmit, to the base station, by controlling the transceiver, uplink control information (UCI) including hybrid automatic repeat request-acknowledgement (HARQ-ACK) via a PUCCH based on the set of initial cyclic offsets,
wherein in case that the plurality of PUCCH resources are not dedicated for the UE, the set of initial cyclic offsets includes 0, 4, and 8,
based on one information bit used for the HARQ-ACK, value of the one information bit is indicated based on one of sequence cyclic offsets including 0 and 6, and
cyclic offset for the UE is determined based on one of the set of initial cyclic offsets and the one of the sequence cyclic offsets.

18. A base station in a wireless communication system, the base station comprising:
a transceiver; and
at least one processor operably connected with the transceiver, the at least one processor configured to:
transmit, to a user equipment (UE), by controlling the transceiver, through high layer signaling, configuration information including information associated with a plurality of physical uplink control channel (PUCCH) resources, wherein a set of initial cyclic offsets is indicated by the information associated with the plurality of PUCCH resources, and
receive, from the UE, by controlling the transceiver, uplink control information (UCI) including hybrid automatic repeat request-acknowledgement (HARQ-ACK) via a PUCCH based on the set of initial cyclic offsets,
wherein in case that the plurality of PUCCH resources are not dedicated for the UE, the set of initial cyclic offsets includes 0, 4, and 8,
based on one information bit used for the HARQ-ACK, value of the one information bit is indicated based on one of sequence cyclic offsets including 0 and 6, and
cyclic offset for the UE is determined based on one of the set of initial cyclic offsets and the one of the sequence cyclic offsets.

\* \* \* \* \*